US011223453B2

(12) United States Patent
Sun et al.

(10) Patent No.: US 11,223,453 B2
(45) Date of Patent: Jan. 11, 2022

(54) DATA TRANSMISSION METHOD AND APPARATUS

(71) Applicant: Huawei Technologies Co., Ltd., Shenzhen (CN)

(72) Inventors: Yanliang Sun, Shenzhen (CN); Bin Liu, San Diego, CA (US)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 54 days.

(21) Appl. No.: 16/480,170

(22) PCT Filed: Feb. 27, 2017

(86) PCT No.: PCT/CN2017/075046
§ 371 (c)(1),
(2) Date: Jul. 23, 2019

(87) PCT Pub. No.: WO2018/133173
PCT Pub. Date: Jul. 26, 2018

(65) Prior Publication Data
US 2019/0372728 A1 Dec. 5, 2019

(30) Foreign Application Priority Data
Jan. 23, 2017 (CN) .......................... 201710058649.2

(51) Int. Cl.
*H04L 5/00* (2006.01)
*H04L 1/06* (2006.01)
*H04W 72/04* (2009.01)

(52) U.S. Cl.
CPC .......... *H04L 5/0023* (2013.01); *H04L 1/0606* (2013.01); *H04L 1/0643* (2013.01); *H04L 1/0668* (2013.01); *H04W 72/0446* (2013.01)

(58) Field of Classification Search
CPC ... H04L 5/0023; H04L 1/0606; H04L 1/0643; H04L 1/0668; H04W 72/0446
See application file for complete search history.

(56) References Cited

U.S. PATENT DOCUMENTS

2012/0058791 A1* 3/2012 Bhattad ................. H04L 5/0016
455/509
2015/0063286 A1 3/2015 Robert Safavi et al.
(Continued)

FOREIGN PATENT DOCUMENTS

CN 102845011 A 12/2012
CN 103580801 A 2/2014
(Continued)

OTHER PUBLICATIONS

Ericsson., "NB-IoT—CCE mapping," R1-160262, 3GPP TSG-RAN1—RAN1#84, St. Julian, Malta, Feb. 15-19, 2016, 6 pages.
(Continued)

*Primary Examiner* — Chi H Pham
*Assistant Examiner* — Ji-Hae Yea
(74) *Attorney, Agent, or Firm* — Conley Rose, P.C.

(57) ABSTRACT

A method includes determining, by a first device, a first resource set and a second resource set in a first transmission subframe; determining a data transmission manner on the first resource set and the second resource set; and implementing data transmission with a second device based on the determined data transmission manner by using the first transmission subframe, where the first resource set is a set of remaining resource elements other than resource elements paired based on a first pairing rule in all resource elements used for data transmission in the first transmission subframe, and the second resource set is a set of the resource elements paired based on the first pairing rule in the first transmission subframe.

20 Claims, 12 Drawing Sheets

(56) References Cited

U.S. PATENT DOCUMENTS

| | | | | |
|---|---|---|---|---|
| 2015/0131560 A1* | 5/2015 | Von Elbwart | ....... | H04W 72/042 370/329 |
| 2016/0021645 A1 | 1/2016 | He | | |

FOREIGN PATENT DOCUMENTS

| | | |
|---|---|---|
| CN | 104186006 A | 12/2014 |
| CN | 104272639 A | 1/2015 |
| EP | 2667535 A1 | 11/2013 |
| WO | 2011052220 A1 | 5/2011 |
| WO | 2011106457 A2 | 9/2011 |

OTHER PUBLICATIONS

Foreign Communication From A Counterpad Application, European Application No. 17892119.3, Extended European Search Report dated Dec. 3, 2019, 7 pages.

Machine Translation and Abstract of International Publication No. WO2011052220, May 5, 2011, 37 pages.

"3rd Generation Partnership Project; Technical Specification Group Radio Access Network; Study on New Radio (NR) Access Technology; Physical Layer Aspects (Release 14)," 3GPP TR 38.802, V1.0.0, Nov. 2016, 64 pages.

"3rd Generation Partnership Project; Technical Specification Group Radio Access Network; Evolved Universal Terrestrial Radio Access (E-UTRA); Physical channels and modulation (Release 14)," 3GPP TS 36.211, V14.1.0, Part 1, Dec. 2016, 7 pages.

"3rd Generation Partnership Project; Technical Specification Group Radio Access Network; Evolved Universal Terrestrial Radio Access (E-UTRA); Physical channels and modulation (Release 14)," 3GPP TS 36.211, V14.1.0, Part 2, Dec. 2016, 61 pages.

"3rd Generation Partnership Project; Technical Specification Group Radio Access Network; Evolved Universal Terrestrial Radio Access (E-UTRA); Physical channels and modulation (Release 14)," 3GPP TS 36.211, V14.1.0, Part 3, Dec. 2016, 71 pages.

"3rd Generation Partnership Project; Technical Specification Group Radio Access Network; Evolved Universal Terrestrial Radio Access (E-UTRA); Physical channels and modulation (Release 14)," 3GPP TS 36.211, V14.1.0, Part 4, Dec. 2016, 36 pages.

Nokia, et al., "DMRS-based Semi-open Loop Schemes for Rank 1 transmission," R1-1608927, 3GPP TSG RAN WG1 Meeting #86bis, Lisbon, Portugal, 6 pages.

Huawei, et al.,"Discussion on DL RS for short TTI," R1-1611159, 3GPP TSG RAN WG1 Meeting #87, Reno, USA, Nov. 14-18, 2016, 6 pages.

Ericsson, "DL DMRS design for 2 OS sTTI," R1-1611519, 3GPP TSG-RAN WG1 #87, Reno, USA, Nov. 14-18, 2016, 5 pages.

Catt, et al.,"WF on orphan RE for semi-open-loop," R1-1613277, WF on orphan RE for semi-open-loop, Reno, USA, Nov. 14-18, 2016, 4 pages.

Qualcomm Inc, "SFBC PDSCH transmission in CSI-RS subframes," R1-104798, 3GPP TSG-RAN WG1 #62 , Madrid, Spain, Aug. 23-27, 2010, 6 pages.

Foreign Communication From A Counterpart Application, PCT Application No. PCT/CN2017/075046, English Translation of International Search Report dated Oct. 11, 2017, 2 pages.

Foreign Communication From A Counterpart Application, PCT Application No. PCT/CN2017/075046, English Translation of Written Opinion dated Oct. 11, 2017, 5 pages.

Machine Translation and Abstract of Chinese Publication No. CN103580801, Feb. 12, 2014, 75 pages.

Foreign Communication From A Counterpart Application, Chinese Application No. 201780009971.4, Chinese Office Action dated Oct. 28, 2019, 7 pages.

* cited by examiner

DATA TRANSMISSION METHOD AND APPARATUS

CROSS-REFERENCE TO RELATED APPLICATIONS

This application is a National Stage of International Patent Application No. PCT/CN2017/075046, filed on Feb. 27, 2017, which claims priority to Chinese Patent Application No. 201710058649.2 filed on Jan. 23, 2017. Both of the aforementioned applications are hereby incorporated by reference in their entireties.

TECHNICAL FIELD

This application relates to the field of communications technologies, and in particular, to a data transmission method and apparatus.

BACKGROUND

An open-loop-full-dimensional-multi-antenna (open-loop-FD-MIMO) solution is defined for a high-speed moving scenario in Release 14 (R14) of Long Term Evolution (long term evolution, LTE). In the open-loop-FD-MIMO solution, space frequency block coding (spatial frequency block coding, SFBC) transmission on a pair of beams is used. In addition, on a physical resource block (physical resource block, PRB), a hybrid configuration including both a downlink demodulation reference signal (demodulation reference signal, DMRS) and a channel state information-reference signal (channel state information-reference signal, CSI-RS) may be used for a reference signal. Consequently, a resource element (resource element, RE) that cannot be paired (in other words, an isolated resource element) may occur in an SFBC resource element pairing process. In addition, there are a plurality of possibilities for an occurrence location and an occurrence frequency of the isolated resource element. Therefore, for any hybrid reference signal configuration, how to determine a location of an isolated resource element and a data transmission solution on the isolated resource element in a current reference signal configuration in the SFBC transmission is a key problem that needs to be resolved in LTE R14.

Currently, for an isolated resource element brought by CSI-RSs on two ports in LTE R10, a terminal first determines whether a current orthogonal frequency division multiplexing (orthogonal frequency division multiplexing, OFDM) symbol in a physical resource block is used. When the current OFDM symbol in the physical resource block is not used, the terminal does not map the entire OFDM symbol in resource mapping, but directly discards the OFDM symbol. In this way, it may be relatively quick to determine an OFDM symbol that meets a resource mapping condition, and decoding is performed by using the OFDM symbol, so that implementation complexity of the terminal is relatively reduced. However, in LTE R14, when transmit diversity transmission is performed on a physical downlink channel (physical downlink shared channel, PDSCH), a scheduled PRB includes a CSI-RS and a DMRS. Therefore, two types of RSs co-exist. In this case, if an SFBC pairing rule does not change, the location of the isolated resource element is more complex, and a quantity of isolated resource elements and an occurrence frequency of an isolated resource element significantly increase. Consequently, it is more possible to discard the entire OFDM symbol.

In conclusion, in LTE R14, resource waste occurs if an entire OFDM symbol is discarded when an isolated resource element exists in the OFDM symbol.

SUMMARY

Embodiments of this application provide a data transmission method and apparatus, to resolve a problem that resource waste occurs because an OFDM symbol including an isolated resource element is discarded in LTE R14.

A first aspect of the embodiments of this application provides a data transmission method, applicable to a first device and a second device that are based on an LTE standard in a communications system, where the first device is optionally a base station or a terminal, and correspondingly, the second device is optionally a terminal or a base station, and the method includes:

determining, by the first device, a first resource set and a second resource set in a first transmission subframe, where the first resource set is a set of remaining resource elements other than resource elements paired based on a first pairing rule in all resource elements used for data transmission in the first transmission subframe, and the second resource set is a set of the resource elements paired based on the first pairing rule in all the resource elements used for data transmission in the first transmission subframe;

determining, by the first device, a data transmission manner on the first resource set and the second resource set; and sending, by the first device, data to the second device based on the determined data transmission manner by using the first transmission subframe, or receiving data sent by the second device in the first transmission subframe.

In an embodiment of this application, the first device can determine locations of the first resource set and the second resource set in the first transmission subframe, and separately determine the data transmission manners on the different resource sets, so that physical layer resources in the first transmission subframe can be utilized to a maximum extent during SFBC transmission in hybrid reference signal configuration, thereby avoiding resource waste.

Optionally, in an embodiment of the first aspect, the determining, by the first device, a data transmission manner on the first resource set and the second resource set includes:

determining, by the first device, that the transmission manner on the second resource set is transmit diversity transmission of space frequency block coding; and determining, by the first device, that the transmission manner on the first resource set is no data transmission or space time block coding transmission.

In this embodiment, different data transmission manners are separately determined on different resource sets, so that physical layer resources can be utilized to a maximum extent when an SFBC mapping rule is met, thereby avoiding resource waste.

Optionally, the first pairing rule includes: Two paired resource elements belong to a same time domain unit and a same frequency domain unit, and cross a maximum of three subcarriers; and the frequency domain unit includes a frequency domain width of one or more physical resource blocks, and the time domain unit includes one or more OFDM symbols.

Optionally, in another embodiment of the first aspect, the determining, by the first device, a first resource set and a second resource set in a first transmission subframe includes:

successively determining, by the first device in a preset sequence, whether all the resource elements used for data transmission in the first transmission subframe meet the first pairing rule;

when a resource element used for data channel mapping on a $k^{th}$ subcarrier and a resource element used for data channel mapping on a $(k+n)^{th}$ subcarrier meet the first pairing rule, determining, by the first device, that the resource elements used for data channel mapping on the $k^{th}$ subcarrier and the $(k+n)^{th}$ subcarrier belong to the second resource set, where n is a positive integer less than 3, k is a sequence number of a subcarrier corresponding to a resource element used for data channel mapping, and k is a positive integer greater than or equal to 1; and determining, by the first device, a set of all resource elements other than resource elements in the second resource set in all the resource elements used for data transmission in the first transmission subframe as the first resource set.

In this technical solution, all the resource elements in the first transmission subframe can be accurately grouped into the first resource set and the second resource set. This provides a basis for subsequent accurate data transmission.

Optionally, in the foregoing embodiment of the first aspect, the method further includes:

after the first device completes determining on all resource elements in all time domain units in a preset frequency domain unit in the first transmission subframe, copying, by the first device, a determining result of each resource element in the preset frequency domain unit to another frequency domain unit in the first transmission subframe, where the frequency domain unit in the first transmission subframe meets the following two conditions: In all frequency domain units, configurations of demodulation reference signals are consistent, configurations of channel state information-reference signals are consistent, and the demodulation reference signals have a same precoding matrix.

The method can greatly reduce determining complexity of the first device, and increase a determining speed, thereby ensuring high efficiency.

Optionally; in yet another embodiment of the first aspect, the determining, by the first device, a first resource set and a second resource set in a first transmission subframe includes:

determining, by the first device, a resource universal set in the first transmission subframe, where the resource universal set includes a plurality of resource subsets, each resource subset includes one or more resource elements, and each resource element has a unique identification sequence number;

receiving, by the first device, first configuration signaling sent by the second device, where the first configuration signaling includes an identification sequence number of one or more resource subsets; and configuring, by the first device, the one or more resource subsets included in the first configuration instruction as the first resource set, and configuring a set of all resource elements other than resource elements in the first resource set in all the resource elements used for data transmission in the first transmission subframe as the second resource set.

In this technical solution, the first device can determine the first resource set and the second resource set in the first transmission subframe. This provides a basis for subsequently determining a data transmission method and implementing accurate data transmission.

Optionally, in still another embodiment of the first aspect, the determining, by the first device, a first resource set and a second resource set in a first transmission subframe includes:

receiving, by the first device, second configuration signaling sent by the second device, where the second configuration instruction is used to indicate a resource universal set:

determining, by the first device, a resource universal set in the first transmission subframe based on the second configuration instruction, where the resource universal set includes a plurality of resource subsets, each resource subset includes one or more resource elements, and each resource element has a unique identification sequence number;

receiving, by the first device, first configuration signaling sent by the second device, where the first configuration signaling includes an identification sequence number of one or more resource subsets; and configuring, by the first device, the one or more resource subsets included in the first configuration instruction as the first resource set, and configuring a set of all resource elements other than resource elements in the first resource set in all the resource elements used for data transmission in the first transmission subframe as the second resource set.

In this technical solution, the first device can also accurately determine the first resource set and the second resource set in the first transmission subframe. This provides a basis for subsequently determining a data transmission method and implementing accurate data transmission.

Optionally, in still another embodiment of the first aspect, the determining, by the first device, that the transmission manner on the second resource set is transmit diversity transmission of space frequency block coding includes:

successively mapping, by the first device, a transmission symbol encoded through space frequency block coding on each of a plurality of antenna ports to physical resources, to be specific, to all the resource elements in the second resource set.

Optionally, in still another embodiment of the first aspect, the determining, by the first device, that the transmission manner on the first resource set is no data transmission or space time block coding transmission includes:

determining, by the first device, that no resource element in the first resource set is mapped to any transmission symbol; or successively mapping, by the first device, a transmission symbol encoded through space time block coding on each of a plurality of antenna ports to all the resource elements in the first resource set.

A second aspect of the embodiments of this application provides a data transmission apparatus, integrated into the first device, where the apparatus includes:

a processing module, configured to determine a first resource set and a second resource set in a first transmission subframe, where the first resource set is a set of remaining resource elements other than resource elements paired based on a first pairing rule in all resource elements used for data transmission in the first transmission subframe, and the second resource set is a set of the resource elements paired based on the first pairing rule in all the resource elements used for data transmission in the first transmission subframe, where the processing module is further configured to determine a data transmission manner on the first resource set and the second resource set; and a transceiver module, configured to send data to a second device based on the determined data transmission manner by using the first transmission subframe, or receive data sent by a second device in the first transmission subframe.

Optionally, when determining the data transmission manner on the first resource set and the second resource set, the processing module is specifically configured to determine that the transmission manner on the second resource set is transmit diversity transmission of space frequency block coding, and determine that the transmission manner on the first resource set is no data transmission or space time block coding transmission.

Optionally, the first pairing rule includes: Two paired resource elements belong to a same time domain unit and a same frequency domain unit, and cross a maximum of three subcarriers; and the frequency domain unit includes a frequency domain width of one or more physical resource blocks, and the time domain unit includes one or more OFDM symbols.

Optionally, when determining the first resource set and the second resource set in the first transmission subframe, the processing module is specifically configured to: successively determine, in a preset sequence, whether all the resource elements used for data transmission in the first transmission subframe meet the first pairing rule; when a resource element used for data channel mapping on a $k^{th}$ subcarrier and a resource element used for data channel mapping on a $(k+n)^{th}$ subcarrier meet the first pairing rule, determine that the resource elements used for data channel mapping on the $k^{th}$ subcarrier and the $(k+n)^{th}$ subcarrier belong to the second resource set; and determine a set of all resource elements other than resource elements in the second resource set in all the resource elements used for data transmission in the first transmission subframe as the first resource set, where n is a positive integer less than 3, k is a sequence number of a subcarrier corresponding to a resource element used for data channel mapping, and k is a positive integer greater than or equal to 1.

Optionally, when determining the first resource set and the second resource set in the first transmission subframe, the processing module is further specifically configured to: after determining on all resource elements in all time domain units in a preset frequency domain unit in the first transmission subframe is completed, copy a determining result of each resource element in the preset frequency domain unit to another frequency domain unit in the first transmission subframe, where the frequency domain unit in the first transmission subframe meets the following two conditions: In all frequency domain units, configurations of demodulation reference signals are consistent, configurations of channel state information-reference signals are consistent, and the demodulation reference signals have a same precoding matrix.

Optionally, when determining the first resource set and the second resource set in the first transmission subframe, the processing module is specifically configured to: determine a resource universal set in the first transmission subframe, where the resource universal set includes a plurality of resource subsets, each resource subset includes one or more resource elements, and each resource element has a unique identification sequence number; receive first configuration signaling sent by the second device, where the first configuration signaling includes an identification sequence number of one or more resource subsets; and configure the one or more resource subsets included in the first configuration instruction as the first resource set, and configure a set of all resource elements other than resource elements in the first resource set in all the resource elements used for data transmission in the first transmission subframe as the second resource set.

Optionally, when determining the first resource set and the second resource set in the first transmission subframe, the processing module is specifically configured to: receive second configuration signaling sent by the second device, where the second configuration instruction is used to indicate a resource universal set; determine a resource universal set in the first transmission subframe based on the second configuration instruction, where the resource universal set includes a plurality of resource subsets, each resource subset includes one or more resource elements, and each resource element has a unique identification sequence number; receive first configuration signaling sent by the second device, where the first configuration signaling includes an identification sequence number of one or more resource subsets; and configure the one or more resource subsets included in the first configuration instruction as the first resource set, and configure a set of all resource elements other than resource elements in the first resource set in all the resource elements used for data transmission in the first transmission subframe as the second resource set.

Optionally, when determining that the transmission manner on the second resource set is the transmit diversity transmission of space frequency block coding, the processing module is specifically configured to: successively map a transmission symbol encoded through space frequency block coding on each of a plurality of antenna ports to physical resources, to be specific, to all the resource elements in the second resource set.

Optionally, when determining that the transmission manner on the first resource set is no data transmission or the space time block coding transmission, the processing module is specifically configured to determine that no resource element in the first resource set is mapped to any transmission symbol; or the first device successively maps a transmission symbol encoded through space time block coding on each of a plurality of antenna ports to all the resource elements in the first resource set.

A third aspect of the embodiments of this application provides a data transmission apparatus, where the apparatus includes a processor and a memory. The memory is configured to store a program, and the processor invokes the program stored in the memory, to perform the method according to the first aspect of the embodiments of this application.

A fourth aspect of the embodiments of this application provides a data transmission apparatus, including at least one processing element (or chip) configured to perform the method according to the first aspect.

A fifth aspect of the embodiments of this application provides a communications system, where the system includes a first device and a second device. The first device is integrated into the data transmission apparatus according to the foregoing aspect. Data transmission is performed between the first device and the second device.

A sixth aspect of the embodiments of this application provides a computer readable storage medium, where the computer readable storage medium stores an instruction. When the instruction is running on a computer, the computer performs the method in the foregoing aspects.

A seventh aspect of the embodiments of this application provides a computer program product that includes an instruction. When the instruction is running on a computer, the computer performs the method in the foregoing aspects.

In the foregoing aspects, the first device determines the first resource set and the second resource set in the first transmission subframe, where the first resource set is the set of the remaining resource elements other than the resource elements paired based on the first pairing rule in all the resource elements used for data transmission in the first transmission subframe, and the second resource set is the set of the resource elements paired based on the first pairing rule in all the resource elements used for data transmission in the first transmission subframe; and the first device determines the data transmission manner on the first resource set and the second resource set, and sends data to the second device based on the determined data transmission manner by using the first transmission subframe, or receives data sent by the second device in the first transmission subframe. In this way, physical layer resources in the first transmission subframe can be utilized to a maximum extent during SFBC transmission in hybrid reference signal configuration, thereby avoiding resource waste.

DESCRIPTION OF EMBODIMENTS

Figure 1:
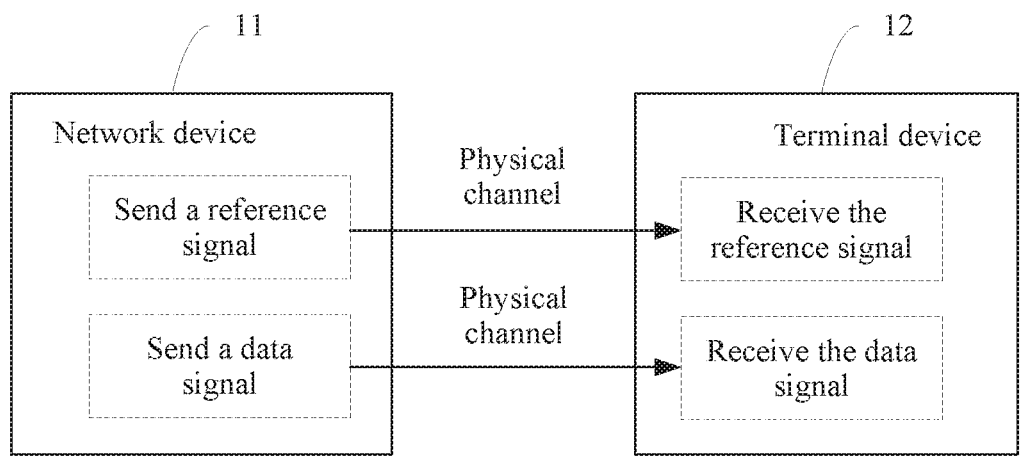
FIG. 1 is a schematic structural diagram of a communications system according to an embodiment of this application.

A data transmission method provided in the following embodiments of this application is applicable to a communications system. FIG. 1 is a schematic structural diagram of a communications system according to an embodiment of this application. As shown in FIG. 1, the communications system provided in this embodiment includes a network device 11 and a terminal device 12. The communications system may be an LTE communications system, or may be another future communications system. This is not limited herein.

The data transmission method provided in this embodiment of this application is applied to data transmission between the network device 11 and the terminal device 12 in the communications system shown in FIG. 1. It should be understood that the data transmission may be downlink transmission in which the network device 11 sends data to the terminal device 12, or may be uplink transmission in which the network device 11 receives data information sent by the terminal device 12. A specific form is determined based on an actual requirement, and is not limited herein.

Optionally, the communications system may further include other network entities such as a network controller and a mobility management entity. This is not limited in this embodiment of this application.

The communications system applied to this embodiment of this application may be a Global System for Mobile Communications (global system of mobile communication, GSM), a Code Division Multiple Access (code division multiple access, CDMA) system, a Wideband Code Division Multiple Access (wideband code division multiple access, WCDMA) system, a general packet radio service (general packet radio service, GPRS) system, a Long Term Evolution (long term evolution, LTE) system, an LTE frequency division duplex (frequency division duplex, FDD) system, an LTE time division duplex (time division duplex, TDD) system, a Universal Mobile Telecommunications System (universal mobile telecommunications system, UMTS), another wireless communications system in which an orthogonal frequency division multiplexing (orthogonal frequency division multiplexing, OFDM) technology is applied, or the like. A system architecture and a service scenario described in this embodiment of this application are intended to more clearly describe the technical solutions in the embodiments of this application, and do not constitute a limitation on the technical solutions provided in the embodiments of this application. A person of ordinary skill in the art may learn that, with evolution of the network architecture and emergence of a new service scenario, the technical solutions provided in the embodiments of this application are applicable to similar technical problems.

The network device 11 used in this embodiment of this application may be configured to provide a wireless communication function for the terminal device 12. The network device 11 may include macro base stations, micro base stations (also referred to as small cells), relay stations, access points, and the like in various forms. The network device 11 may be a base station (base transceiver station, BTS) in a GSM or CDMA, a base station (NodeB, NB) in WCDMA, an evolved NodeB (evolutional NodeB, eNB or e-NodeB) in LTE, or a corresponding device gNB in a 5G network. For ease of description, in all the embodiments of this application, apparatuses that provide a wireless communication function for the terminal device are collectively referred to as a network device.

In this embodiment of this application, the terminal device 12 may also be referred to as user equipment (user equipment, UE), a mobile station (mobile station, MS), a mobile terminal (mobile terminal), a terminal (terminal), or the like. The terminal device 12 may communicate with one or more core networks by using a radio access network (radio access network, RAN). For example, the terminal device 12 may be a mobile phone (or referred to as a "cellular" phone) or a computer with a mobile terminal. For example, the terminal device 12 may alternatively be a portable, pocket-sized, handheld, computer built-in, or in-vehicle mobile apparatus, which exchanges voice and/or data with the radio access network. This is not specifically limited in this embodiment of this application.

For example, as shown in FIG. 1, the terminal device 12 communicates with the network device 11 by using a physical channel. The network device 11 sends a reference signal on the physical channel, so that the terminal device 12 performs channel estimation. The network device 11 sends a data signal on the physical channel, so that the terminal device 12 receives and demodulates the data signal. For a specific terminal device, the data signal and the reference signal occur in same scheduled bandwidth. Time division multiplexing transmission and frequency division multiplexing transmission are performed on the reference signal and the data signal in a unit of a time-frequency resource element. The reference signal may include a quantity of specific types of reference signals for different purposes, for example, may include a CSI-RS used to obtain channel state information, a DMRS used for demodulation, and the like. Any one of the foregoing types of reference signals for specific purposes has a specific time-frequency resource pattern.

In a future mobile communications system, a multi-antenna technology will be widely used in the network device 11 and the terminal device 12. To further improve coverage and capacity performance of the mobile communications system, both the reference signal and the data signal are sent by using a beamforming technology. Half-open-loop-multi-antenna transmission discussed in a 3GPP R14 is a data transmission technology in which open-loop precoding is further performed on an RE on a data channel based on a closed-loop precoding DMRS. If a precoding matrix $P_1$ of the DMRS may be determined based on channel feedback information of the terminal device, a precoding matrix $P_2(j)$ on a $j^{th}$ RE on the data channel is obtained by multiplying a precoding matrix $P_1$ of a DMRS on the resource block by an open-loop precoding matrix $\tilde{P}_2(j)$, that is, $P_2(j)=P_1\times\tilde{P}_2(j)$. Open-loop precoding matrices $\tilde{P}_2(j)$ on all REs are inconsistent.

The "plurality" in the embodiments of this application means "two or more". The term "and/or" describes an association relationship between associated objects, and represents that three relationships may exist. For example, A and/or B may represent the following three cases: Only A exists, both A and B exist, and only B exists. The character "/" generally indicates an "or" relationship between the associated objects.

The following first briefly describes a scenario to which this embodiment of this application is applicable.

As a long term evolution standard, LTE enables a new technology research and commercial application of land mobile communications networks to be smoothly carried out. In LTE Release 13 (LTE R13), a full-dimensional-multi-antenna (FD-MIMO) technology is introduced. To be specific, horizontal dimension beamforming and vertical dimension beamforming are simultaneously performed by using a two-dimensional antenna array on a network device side, and corresponding precoding codebook enhancement, feedback procedure enhancement, and the like are accordingly performed, so that a cell capacity is significantly increased through the enhancement. However, because of two-dimensional beamforming, a precoding codebook in LTE R13 becomes significantly larger than that in LTE R12, and a feedback procedure becomes more complex in LTE R13. Therefore, a precoding feedback period in LTE R13 is relatively long. Consequently, precoding of LTE R13 generally can work only in a relatively static environment. In a high-speed moving scenario, a similar full-dimensional beamforming solution is defined, that is, an open-loop-3D-MIMO solution, which becomes an important subject in LTE R14.

In LTE R8, some open-loop transmission modes such as transmit diversity in a transmission mode 2 and large cycle latency transmission in a transmission mode 3 are defined for the high-speed moving scenario. However, only signals of a maximum of four antennas can be transmitted in the foregoing two transmission modes because channel estimation depends on a cell-level reference signal. Consequently, a cell capacity cannot be effectively increased through vertical dimension beamforming. Therefore, in LTE R14, a vertical dimension beamforming solution, that is, an open-loop-FD-MIMO solution, similar to that in LTE R13 needs to be defined for the high-speed moving scenario.

Actually, it has been determined that SFBC transmission on a pair of beams is used in the open-loop-FD-MIMO solution. The SFBC transmission requires that two REs that are in a same OFDM symbol and on a same PRB and whose frequency domain does not exceed three subcarriers be paired. However, different from an earlier release, a DMRS is used as a reference signal in the SFBC transmission discussed in LTE R14. In consideration of a time-frequency resource occupied by the DMRS, a resource element that cannot be paired, in other words, an isolated resource element, may occur in an SFBC RE pairing process.

Figure 2:
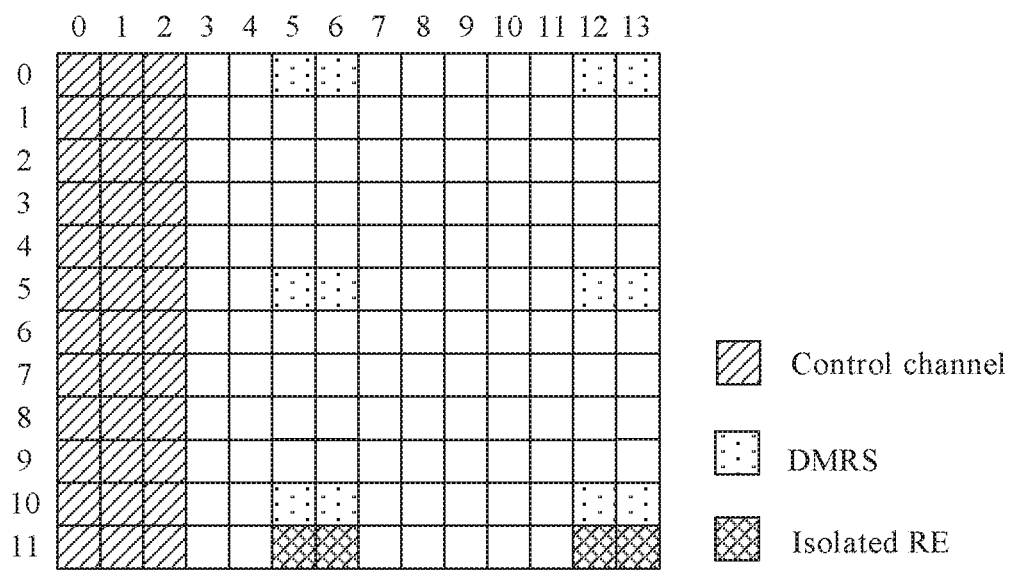
FIG. 2 is a schematic diagram of a location of an isolated resource element occurring when only a DMRS is configured in a PRB.

FIG. 2 is a schematic diagram of a location of an isolated resource element occurring when only a DMRS is configured in a PRB. In FIG. 2, one row represents one subcarrier, one column represents one OFDM symbol, and 12 subcarriers herein constitute one physical resource block PRB. As shown in FIG. 2, on a twelfth subcarrier, isolated resource elements (isolated REs) occur at locations corresponding to a sixth OFDM symbol, a seventh OFDM symbol, a thirteenth OFDM symbol, and a fourteenth OFDM symbol.

Further, when a CSI-RS is configured in a PRB in which a DMRS is configured, an occurrence location, an occurrence frequency, and the like of an isolated resource element may change according to the SFBC RE pairing rule defined above. There are even a plurality of possibilities for an occurrence location of an isolated resource element in a reference signal configuration.

Figure 3:
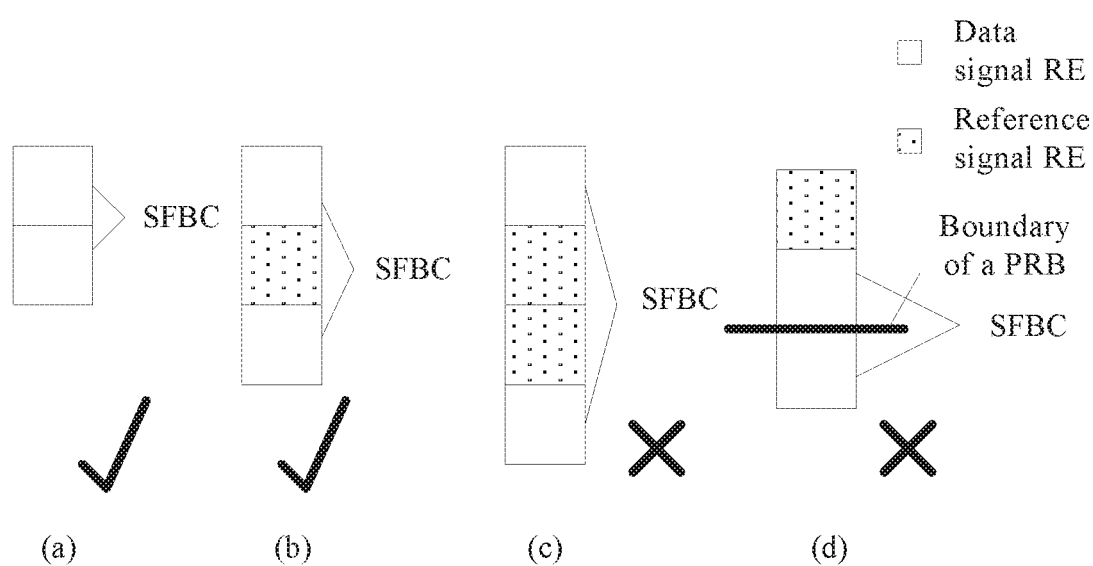
FIG. 3 is an SFBC RE pairing rule in LTE R10.

Optionally, in LTE R10, if a CSI-RS exists in scheduled bandwidth of a downlink terminal device, an isolated resource element may occur because of CSI-RSs on two ports. In this case, a processing procedure in existing LTE R10 is specifically as follows: In SFBC transmission in LTE R10, the terminal device first determines whether a current OFDM symbol is used, and if the current OFDM symbol is used, the terminal device maps the entire OFDM symbol in resource mapping; or if the current OFDM symbol is not used, the terminal device directly discards the OFDM symbol, and does not map the entire OFDM symbol in resource mapping. FIG. 3 is an SFBC RE pairing rule in LTE R10. In LTE R10, referring to FIG. 3, the following rule is defined based on SFBC RE pairing:

First, two REs that participate in SFBC pairing need to be in a same OFDM symbol.

Second, the two REs that participate in SFBC pairing need to be on a same physical resource block PRB.

Third, the two REs that participate in SFBC pairing need to cross a maximum of three subcarriers; in other words, there is a maximum of one subcarrier between two paired REs.

As shown in FIG. 3, according to the foregoing rule, SFBC pairing on two data signal REs in (a) in FIG. 3 and (b) in FIG. 3 can be implemented, but SFBC pairing on two data signal REs in (c) in FIG. 3 and (d) in FIG. 3 cannot be implemented. In this way, when both a data signal RE and a reference signal RE exist in transmission bandwidth, REs that can implement SFBC pairing with some data signal REs cannot be found for the data signal REs because of limitation of the pairing rule. These data signal REs are isolated REs.

Based on the criterion defined in LTE R10, an isolated RE searching and processing procedure in SFBC is generally as follows:

Step 1: Determine whether a quantity of remaining resource elements other than resource elements used for a CSI-RS in a PRB in scheduled bandwidth in a current OFDM symbol is an even number. If the quantity is an even number, step 2 is performed; or if the quantity is not an even number, it indicates that an isolated RE exists in the current OFDM symbol. Therefore, resource mapping in the current OFDM symbol is interrupted.

Step 2: If a CSI-RS crosses more than two consecutive subcarriers, determine whether a resource element that cannot be paired in the SFBC exists. If the resource element that cannot be paired in the SFBC exists, resource mapping in the current OFDM symbol is interrupted; or if the resource element that cannot be paired in the SFBC does not exist, resource element pairing and SFBC resource mapping are performed.

Optionally, there are few cases in which the CSI-RS defined in LTE R10 crosses more than two consecutive subcarriers. Therefore, the terminal device may quickly determine, by using the foregoing determining criterion, whether the current OFDM symbol meets a resource mapping condition. When the current OFDM symbol meets the resource mapping condition, the terminal device performs resource mapping and decoding, so that implementation complexity of the terminal device is relatively reduced.

However, when the determining rule in LTE R10 is directly applied to LTE R14, the foregoing solution has the following disadvantages: First: In R14, when transmit diversity transmission is performed on a PDSCH, a scheduled PRB includes not only a CSI-RS but also a DMRS. Because two types of reference signals RSs exist, if an SFBC pairing rule does not change, RE isolation is more complex. In this case, the foregoing procedures for searching and processing an isolated resource element cannot be used to determine whether a current OFDM symbol is used for resource mapping and rate matching. Second, in R14, a DMRS also results in RE isolation, and the DMRS may exist in each subframe. In this case, if an entire OFDM symbol that does not meet the mapping condition is directly discarded as described in R10, resources are wasted.

Further, in LTE R14, a plurality of new types of aperiodic CSI-RSs are defined, and some of the new types of aperiodic CSI-RSs may be dynamically activated, and a quantity of periodic CSI-RSs significantly increases. Therefore, in comparison with LTE R10, an RE isolation problem caused by both the CSI-RS and the DMRS in LTE R14 may be more complex. A location of the isolated RE may be ambiguous.

Figure 4:
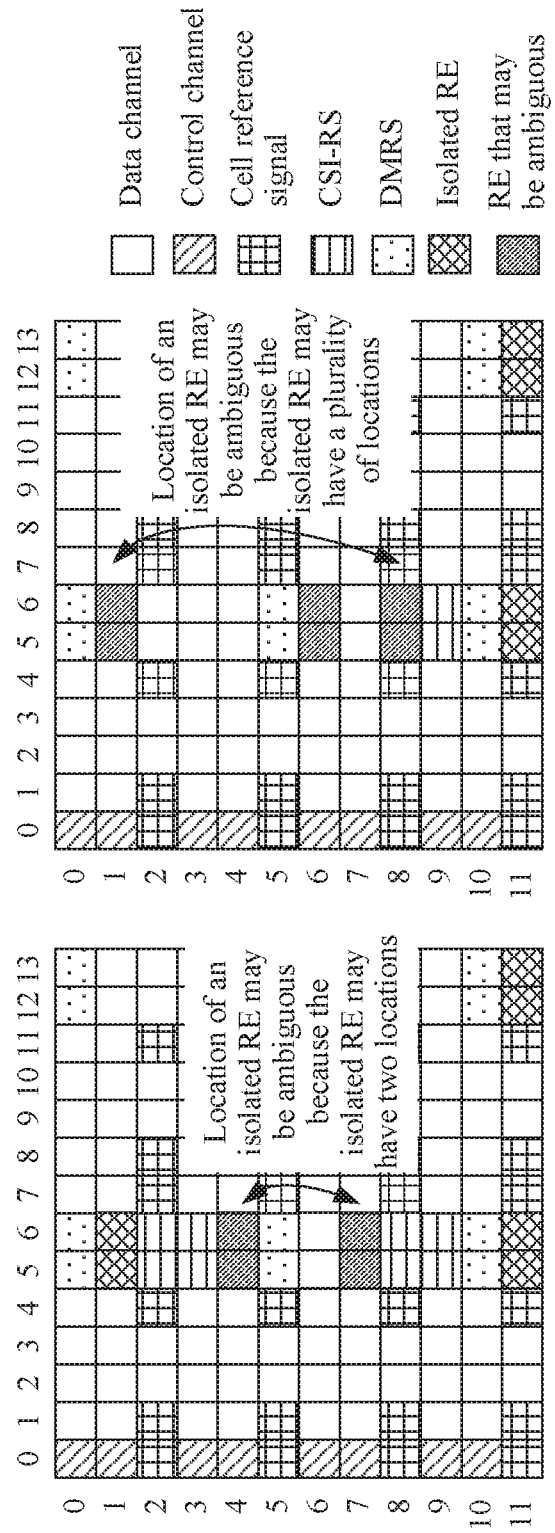
FIG. 4 is a schematic diagram of distribution of possible ambiguity of an isolated resource element.

For example, FIG. 4 is a schematic diagram of distribution of possible ambiguity of an isolated resource element. As shown in (a) in FIG. 4, in a sixth OFDM symbol or a seventh OFDM symbol, SFBC pairing may be implemented between either a resource element on a fourth subcarrier or a resource element on an eighth subcarrier and a resource element on a seventh subcarrier. Therefore, in (a) in FIG. 4, an isolated RE may be the resource element on the fourth subcarrier in the sixth OFDM symbol or the seventh OFDM symbol, or the resource element on the eighth subcarrier in the sixth OFDM symbol or the seventh OFDM symbol; in other words, a location of the isolated RE may be ambiguous because the isolated RE may have two locations.

As shown in (b) in FIG. 4, resource element pairing in a sixth OFDM symbol or a seventh OFDM symbol has the following possibilities: In a first possibility, SFBC pairing is implemented between a resource element on a second subcarrier and a resource element on a third subcarrier, and SFBC pairing is implemented between a resource element on a seventh subcarrier and a resource element on an eighth subcarrier; and in this case, a resource element on a ninth subcarrier becomes an isolated RE. In a second possibility, SFBC pairing needs to be implemented between a resource element on a second subcarrier and a resource element on a third subcarrier, and SFBC pairing is implemented between a resource element on a ninth subcarrier and a resource element on an eighth subcarrier; and in this case, a resource element on a seventh subcarrier becomes an isolated RE. In a third possibility, SFBC pairing is implemented between a resource element on a ninth subcarrier and a resource element on an eighth subcarrier, and SFBC pairing is implemented between a resource element on a seventh subcarrier and a resource element on a fifth subcarrier; and in this case, a resource element on a second subcarrier becomes an isolated RE. Therefore, in (b) in FIG. 4, the isolated RE may be the resource element on the second subcarrier, the resource element on the seventh subcarrier, or the resource element on the ninth subcarrier. In this case, there is a plurality of possibilities for a location of the isolated RE; in other words, the location of the isolated RE may be ambiguous because the isolated RE may have a plurality of locations.

The embodiments of this application provide a data transmission method and apparatus. For a hybrid configuration problem of any reference signal configured in a transmission subframe, a location of an isolated resource element and a data transmission solution on the isolated resource element in a current reference signal configuration in SFBC transmission are determined, to implement resource mapping and rate matching in the SFBC transmission, thereby avoiding resource waste.

Figure 5:
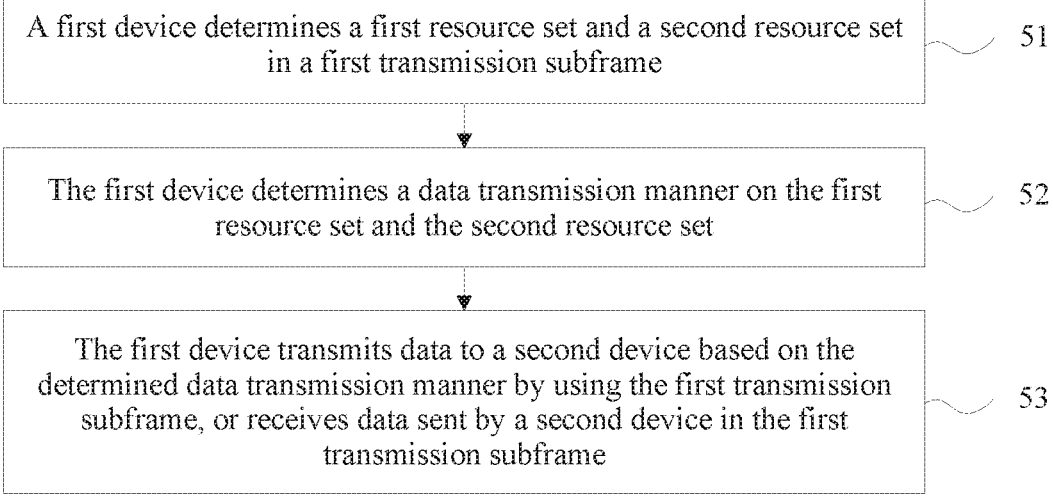
FIG. 5 is a schematic flowchart of Embodiment 1 of a data transmission method according to this application.

FIG. 5 is a schematic flowchart of Embodiment 1 of a data transmission method according to this application. This embodiment of this application is applicable to all terminals and base stations based on an LTE standard. LTE baseband transceiver modules of the terminals and the base stations will use a technical solution in this embodiment of this application. Therefore, in this embodiment, a first device may be a terminal or a base station, which may be determined based on an actual requirement. This is not limited in this embodiment. Specifically, as shown in FIG. 5, the data transmission method may include the following steps:

Step 51: The first device determines a first resource set and a second resource set in a first transmission subframe.

The first resource set is a set of remaining resource elements other than resource elements paired based on a first pairing rule in all resource elements used for data transmission in the first transmission subframe, and the second resource set is a set of the resource elements paired based on the first pairing rule in all the resource elements used for data transmission in the first transmission subframe.

In this embodiment, the first pairing rule includes: Two paired resource elements belong to a same time domain unit and a same frequency domain unit, and cross a maximum of three subcarriers. The frequency domain unit includes a frequency domain width of one or more physical resource blocks, and the time domain unit includes one or more OFDM symbols.

It should be noted that the frequency domain unit includes but is not limited to a frequency domain width of one or more physical resource blocks, and optionally, the frequency domain unit may be a subband with a same DMRS precoding matrix P1; and the time domain unit includes but is not limited to one or more OFDM symbols. Definitions and scopes of the frequency domain unit and the time domain unit may be determined based on an actual situation. This is not limited in this embodiment.

Specifically, in this embodiment, a base station and a terminal in a communications system may separately learn a location of an isolated RE set by using the first pairing rule. Optionally, in this embodiment, the isolated RE set is defined as the first resource set. A set of resource elements other than resource elements in the first resource set in all the resource elements used for data transmission in the first transmission subframe is defined as the second resource set.

In actual application, if a resource element RE on a $k^{th}$ subcarrier in an OFDM symbol is used for transmit diversity PDSCH transmission, a resource element used for PDSCH transmission on a $(k+n)^{th}$ subcarrier in the same OFDM symbol needs to be found for the resource element on the $k^{th}$ subcarrier for pairing and transmission, where n<3. If a resource element that can be paired on the $k^{th}$ subcarrier cannot be found, it is considered that the resource element on the $k^{th}$ subcarrier cannot be paired, and the resource element is marked as an isolated RE. Herein, k is a sequence number of a subcarrier corresponding to a resource element used for data channel mapping, and k is a positive integer greater than or equal to 1.

For example, the first device may alternatively configure the first resource set and the second resource set by receiving a configuration instruction. Optionally, when a universal set is statically configured, or semi-statically configured through radio resource management (Radio Resource Control, RRC), the first resource set may be activated through RRC, or by using a MAC layer control element (MAC control element, MAC CE) or downlink control information (Downlink control information. DCI). It should be noted that, generally, a configuration capability of the base station is higher than that of the terminal. Therefore, in this embodiment, the first device is optionally a terminal; in other words, the terminal configures the first resource set and the second resource set by receiving a configuration instruction of the base station.

Optionally, if the universal set is formed by defining an RE pair set in advance or configuring an RE pair set through RRC, an RE pair is numbered regardless of the used method. Therefore, a subset may be activated by sending a corresponding number; in other words, the universal set is divided into the first resource set and the second resource set.

Optionally, if the subset is semi-statically activated through RRC, when a CSI-RS and the subset are simultaneously activated on some REs, the subset is covered by the CSI-RS; in other words, the subset is deactivated.

Step 52: The first device determines a data transmission manner on the first resource set and the second resource set.

The first device may configure data transmission on an isolated RE according to the following rules: First, the isolated RE may be left empty, and no data is sent on the isolated RE, and in this case, the isolated RE is not considered in rate matching; second, when resource mapping is performed on the isolated RE through space time block coding (spatial time block coding, STBC), data is first mapped to a common OFDM symbol, and then is mapped to an OFDM symbol encoded by using the STBC; third, SFBC pairing is not performed on the isolated RE, but data is transmitted by using a single port.

Optionally, after the first device determines a set of all isolated REs in the first transmission subframe, the first device separately determines the data transmission manners on the first resource set and the second resource set based on a feature of the transmission manner. To be specific, the first device determines that the transmission manner on the second resource set is transmit diversity transmission of space frequency block coding, and that the transmission manner on the first resource set is no data transmission or space time block coding transmission.

Specifically, that the first device determines that the transmission manner on the second resource set is the transmit diversity transmission of space frequency block coding includes: In SFBC transmit diversity transmission, the first device successively maps a transmission symbol encoded through space frequency block coding on each of a plurality of antenna ports to physical resources, to be specific, to all the resource elements in the second resource set, so that resource mapping meets an SFBC mapping rule.

For example, that the first device determines that the transmission manner on the first resource set is the space time block coding transmission includes: Before or after performing resource mapping of a corresponding transmission symbol encoded through space frequency block coding, the first device successively maps a transmission symbol encoded through space time block coding on each of a plurality of antenna ports to all the resource elements in the first resource set.

For another example, that the first device determines that the transmission manner on the first resource set is no data transmission includes: The first device determines that no transmission symbol is mapped to any resource element in the first resource set.

Step 53: The first device transmits data to a second device based on the determined data transmission manner by using the first transmission subframe, or receives data sent by a second device in the first transmission subframe.

In this embodiment, after determining a transmission manner of all the resource elements used for data transmission in the first transmission subframe, the first device notifies the second device of the determined data transmission manner. In this way, data transmission may be implemented between the first device and the second device in the determined data transmission manner. To be specific, the first device sends data to the second device based on the determined data transmission manner by using the first transmission subframe, or receives data sent by the second device in the first transmission subframe.

Specifically, when the first device does not transmit data on the first resource set in the first transmission subframe, the second device cannot receive data information from the first resource set in the first transmission subframe. When the first device sends data to the second device on the first resource set through space time block coding transmission, or sends data to the second device on the second resource set through space frequency block coding transmission, correspondingly, the second device separately receives the data from the first resource set and the second resource set in the first transmission subframe based on the transmission manner of the first device. Likewise, when the second device sends data to the first device on the first resource set through space time block coding transmission, or sends data to the first device on the second resource set through space frequency block coding transmission, the first device separately receives, based on the data transmission manner of the second device, the data sent by the second device on the first resource set and the second resource set in the first transmission subframe.

In the data transmission method provided in this embodiment of this application, the first device determines the first resource set and the second resource set in the first transmission subframe, where the first resource set is the set of the remaining resource elements other than the resource elements paired based on the first pairing rule in all the resource elements used for data transmission in the first transmission subframe, and the second resource set is the set of the resource elements paired based on the first pairing rule in all the resource elements used for data transmission in the first transmission subframe; and the first device determines the data transmission manner on the first resource set and the second resource set, and sends data to the second device based on the determined data transmission manner by using the first transmission subframe, or receives data sent by the second device in the first transmission subframe. In this technical solution, the first device can determine locations of the first resource set and the second resource set, and separately determine the data transmission manners on the different resource sets, so that physical layer resources in the first transmission subframe can be utilized to a maximum extent during SFBC transmission in hybrid reference signal configuration, thereby avoiding resource waste.

For example, based on the embodiment shown in FIG. 5, the foregoing step 51 (the first device determines the first resource set and the second resource set in the first transmission subframe) may be implemented in the following possible manner, as specifically shown in FIG. 6.

Figure 6:
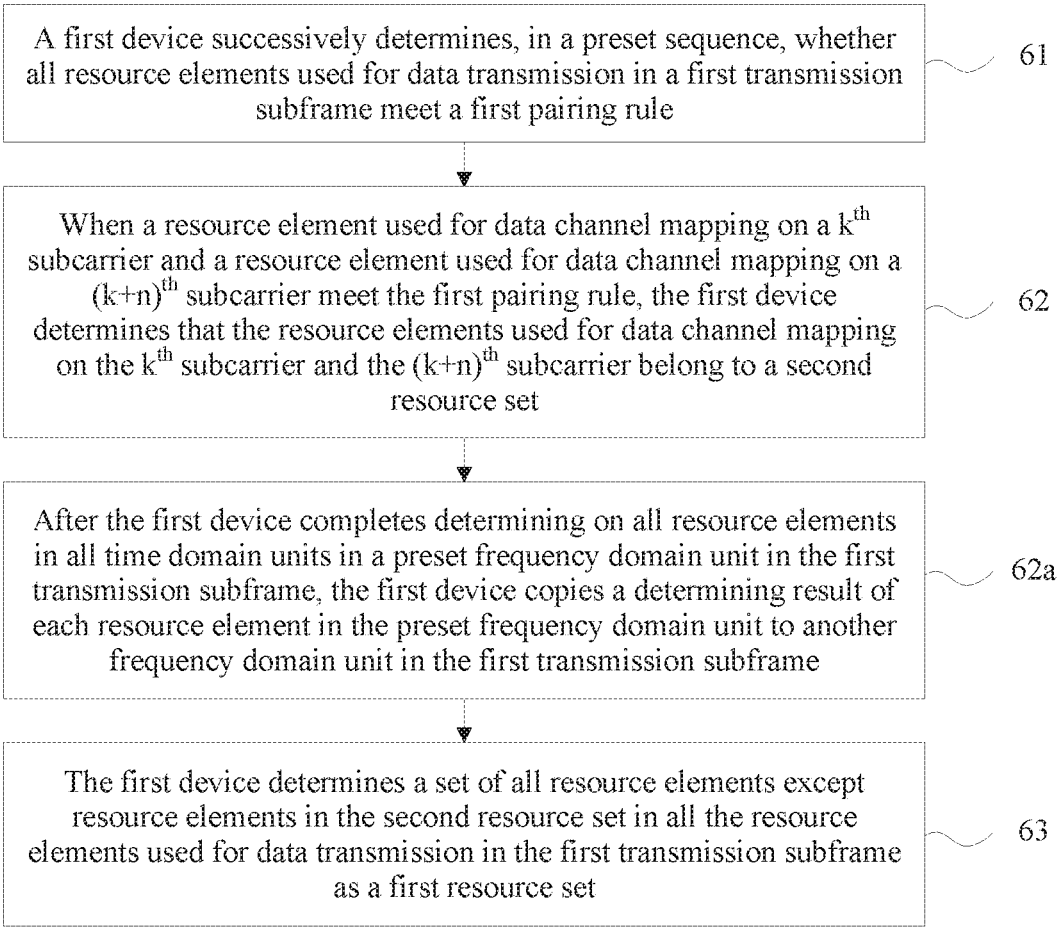
FIG. 6 is a schematic flowchart of Embodiment 2 of a data transmission method according to this application.

FIG. 6 is a schematic flowchart of Embodiment 2 of a data transmission method according to this application. As shown in FIG. 6, in this embodiment of this application, step 51 may include the following steps:

Step 61: A first device successively determines, in a preset sequence, whether all resource elements used for data transmission in a first transmission subframe meet a first pairing rule.

Optionally, in all the resource elements in a physical resource block that are used for data transmission in the first transmission subframe, a frequency domain unit and a time domain unit may be determined first. In this way, for all resource elements in the frequency domain unit and the time domain unit, it is successively determined, from a sequence number of a subcarrier corresponding to a first resource element used for data channel mapping, whether each resource element meets the first pairing rule; in other words, it is successively determined whether each resource element belongs to the first resource set or the second resource set.

Step 62: When a resource element used for data channel mapping on a $k^{th}$ subcarrier and a resource element used for data channel mapping on a $(k+n)^{th}$ subcarrier meet the first pairing rule, the first device determines that the resource elements used for data channel mapping on the $k^{th}$ subcarrier and the $(k+n)^{th}$ subcarrier belong to a second resource set.

n is a positive integer less than 3, k is a sequence number of a subcarrier corresponding to a resource element used for data channel mapping, and k is a positive integer greater than or equal to 1.

Specifically, when the resource element used for data channel mapping on the $k^{th}$ subcarrier and the resource element used for data channel mapping on the $(k+n)^{th}$ subcarrier meet the first pairing rule, and SFBC pairing may be performed between the two resource elements, it indicates that neither the resource element used for data channel mapping on the $k^{th}$ subcarrier nor the resource element used for data channel mapping on the $(k+n)^{th}$ subcarrier becomes an isolated RE. To be specific, the first device determines that the resource elements used for data channel mapping on the $k^{th}$ subcarrier and the $(k+n)^{th}$ subcarrier belong to the second resource set.

Optionally, after determining a set to which the resource element used for data channel mapping on the $k^{th}$ subcarrier belongs, the first device sets a sequence number of a subcarrier corresponding to a next resource element used for data channel mapping to k, and repeats the foregoing determining process, until a resource element used for data channel mapping on a last subcarrier in the first transmission subframe is determined.

Step 63: The first device determines a set of all resource elements other than resource elements in the second resource set in all the resource elements used for data transmission in the first transmission subframe as a first resource set.

Optionally, after all the resource elements used for data transmission in the first transmission subframe are determined based on the first pairing rule, resource elements between which SFBC pairing can be implemented are grouped into the second resource set. In this way, resource elements between which SFBC pairing cannot be implemented and that are in all the resource elements used for data transmission in the first transmission subframe are grouped into the first resource set. Actually, the first resource set is the set of all the resource elements other than the resource elements in the second resource set in all the resource elements used for data transmission in the first transmission subframe.

It should be noted that, in a communications system, similarly, a second device that needs to implement data communication with the first device also determines the first resource set and the second resource set in the first transmission subframe by performing the determining steps of step 61 to step 63. In this way, data communication can be implemented between the first device and the second device in a same data transmission manner.

Optionally, in the data transmission method shown in FIG. 6, as shown in FIG. 6, before step 63, the method may further include the following step 62a.

Step 62a: After the first device completes determining on all resource elements in all time domain units in a preset frequency domain unit in the first transmission subframe, the first device copies a determining result of each resource element in the preset frequency domain unit to another frequency domain unit in the first transmission subframe.

The frequency domain unit in the first transmission subframe meets the following two conditions: In all frequency domain units, configurations of demodulation reference signals are consistent, configurations of channel state information-reference signals are consistent, and the demodulation reference signals have a same precoding matrix.

Optionally, the first device may group the resource elements in the first transmission subframe into a plurality of frequency domain units and a plurality of time domain units for determining. For example, after completing determining on all the resource elements in the preset time domain unit in the first transmission subframe, the first device may switch to a next time domain unit, and repeat the foregoing determining process, until all the resource elements in all the time domain units in the first transmission subframe are determined.

Optionally, after completing determining on all the resource elements in all the time domain units in the preset frequency domain unit in the first transmission subframe, the first device may copy, to another frequency domain unit, a determining result about whether each resource element in the preset frequency domain unit belongs to the first resource set.

It should be noted that a frequency domain unit for which the method in step 62a can be used needs to meet the following two conditions: Reference signals (to be specific, demodulation reference signals and channel state information-reference signals) in all frequency domain units have totally consistent configurations, and the demodulation reference signals have a same precoding matrix. For example, when the base station sends data to the terminal, all the frequency domain units are subbands with a same DMRS precoding matrix.

The method in step 62a can greatly reduce determining complexity of the first device, and increase a determining speed, thereby ensuring high efficiency.

In the data transmission method provided in this embodiment of this application, when the first device determines the first resource set and the second resource set in the first transmission subframe, the first device may successively determine, in a preset sequence, whether all the resource elements used for data transmission in the first transmission subframe meet the first pairing rule. When the resource element used for data channel mapping on the $k^{th}$ subcarrier and the resource element used for data channel mapping on the $(k+n)^{th}$ subcarrier meet the first pairing rule, the first device determines that the resource elements used for data channel mapping on the $k^{th}$ subcarrier and the $(k+n)^{th}$ subcarrier belong to the second resource set, and determines the set of all the resource elements other than the resource elements in the second resource set in all the resource elements used for data transmission in the first transmission subframe as the first resource set. In this technical solution, all the resource elements in the first transmission subframe can be accurately grouped into the first resource set and the second resource set. This provides a basis for subsequent accurate data transmission.

Figure 7A:
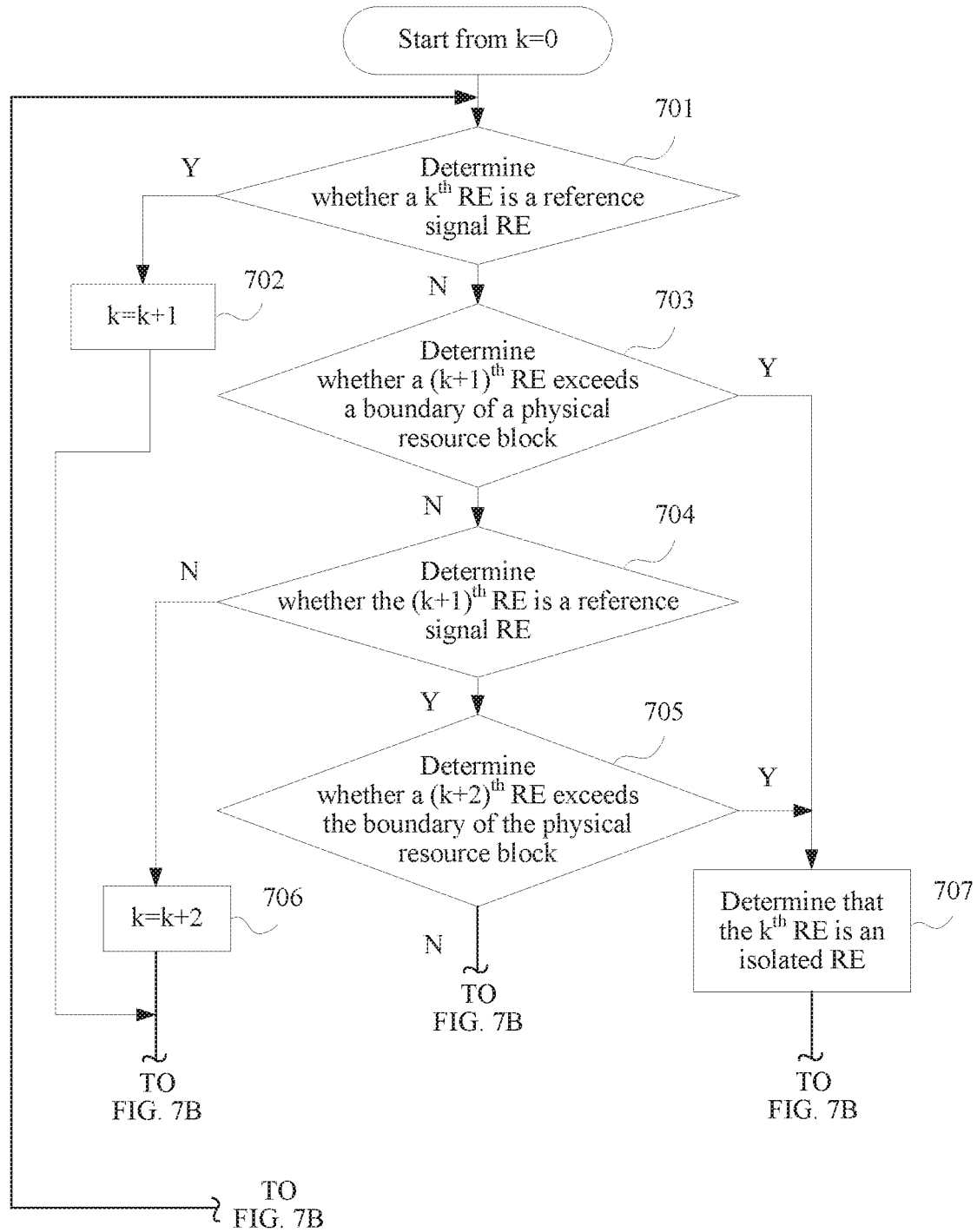
FIG. 7A and FIG. 7B are a schematic flowchart of determining a first resource set and a second resource set by a first device.
Figure 7B:
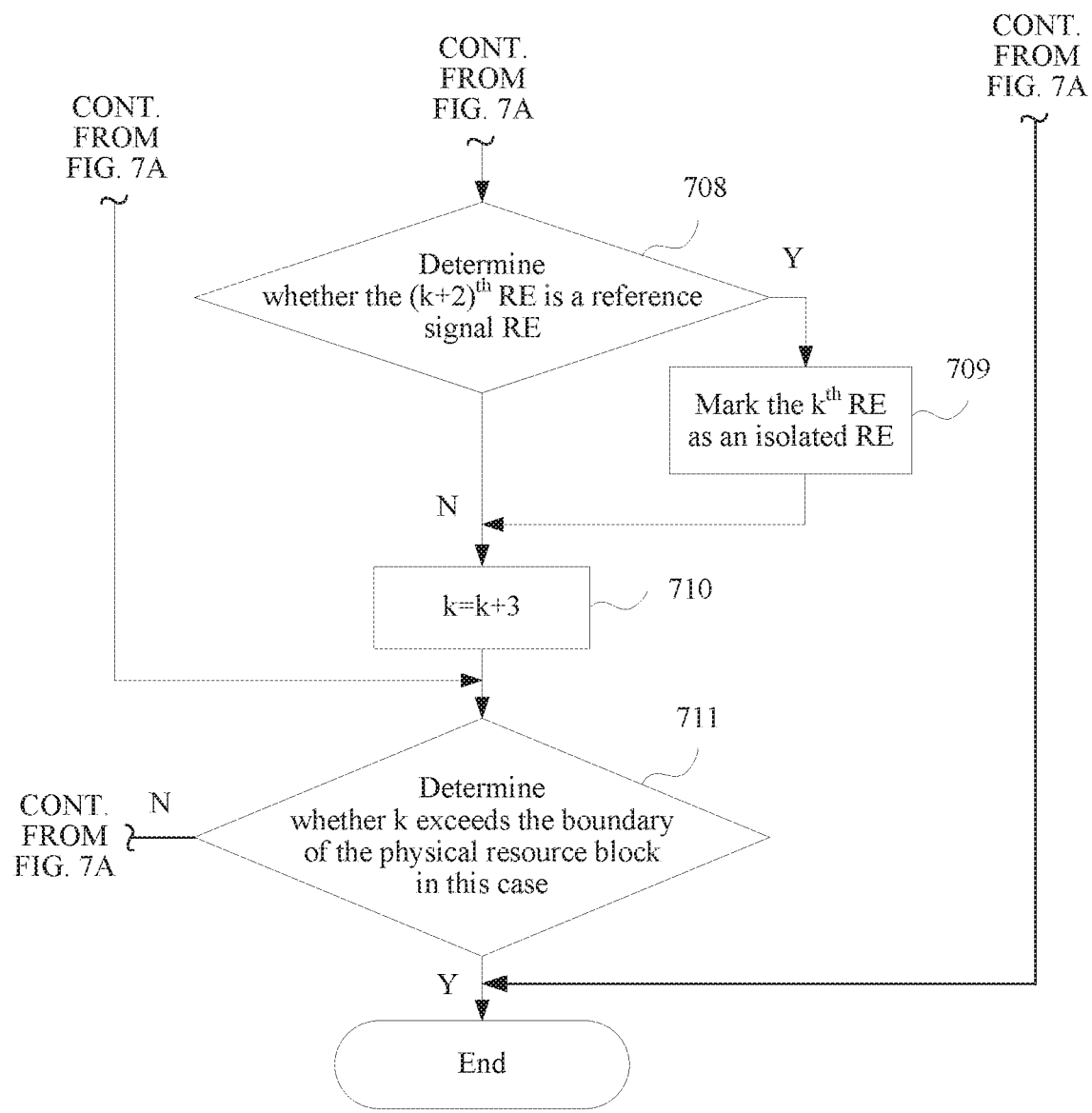
Figure 8:
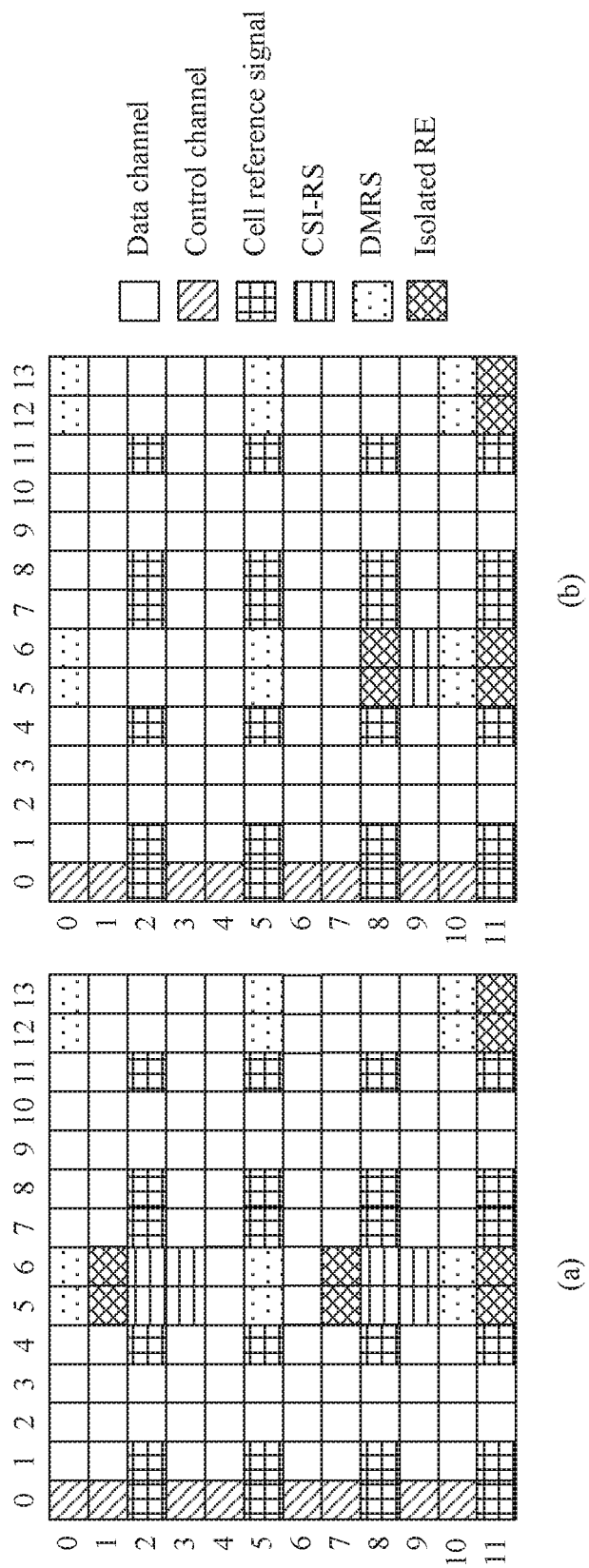
FIG. 8 is a schematic diagram of a determining result of an isolated RE included in the first resource set in FIG. 7A and FIG. 7B.

The following describes in detail the method in FIG. 6 with reference to FIG. 7A, FIG. 7B, and FIG. 8. FIG. 7A and FIG. 7B are a schematic flowchart of determining a first resource set and a second resource set by a first device. FIG. 8 is a schematic diagram of a determining result of an isolated RE included in the first resource set in FIG. 7A and FIG. 7B. This embodiment is described by using the first device as a terminal. As shown in FIG. 8, the physical resource block includes 12 subcarriers. Each subcarrier is considered as one RE. Therefore, the physical resource block includes 12 REs. The terminal starts determining from an RE with k=0. Specific details are as follows.

Step 701: Determine whether a $k^{th}$ RE is a reference signal RE. If the $k^{th}$ RE is a reference signal RE, sequentially perform step 702 and step 711; or if the $k^{th}$ RE is not a reference signal RE, perform step 703.

If the $k^{th}$ RE is a reference signal RE, it means that SFBC pairing cannot be performed on the $k^{th}$ RE, and the $k^{th}$ RE cannot be marked as an isolated RE. Therefore, k+1 is assigned to k. In addition, a $(k+1)^{th}$ RE is determined when the $(k+1)^{th}$ RE does not exceed a boundary of the physical resource block. Alternatively, if the $k^{th}$ RE is not a reference signal RE, step 703 is performed for further determining.

Step 702: k=k+1.

Step 703: Determine whether a $(k+1)^{th}$ RE exceeds a boundary of a physical resource block. If the $(k+_1)^{th}$ RE exceeds the boundary of the physical resource block, perform step 707; or if the $(k+1)^{th}$ RE does not exceed the boundary of the physical resource block, perform step 704.

If the $(k+1)^{th}$ RE exceeds the boundary of the physical resource block, it means that the $k^{th}$ RE is a last RE, and there is no RE to be paired with the $k^{th}$ RE. Therefore, it is determined that the $k^{th}$ RE is an isolated RE, and the determining ends. Alternatively, if the $(k+1)^{th}$ RE does not exceed the boundary of the physical resource block, the determining continues.

Step 704: Determine whether the $(k+1)^{th}$ RE is a reference signal RE. If the $(k+1)^{th}$ RE is a reference signal RE, perform step 705; or if the (k+1) RE is not a reference signal RE, sequentially perform step 706 and step 711.

If the $(k+1)^{th}$ RE is a reference signal RE, a next determining step is performed. Alternatively, if the $(k+1)^{th}$ RE is not a reference signal RE, it indicates that SFBC pairing can be implemented between the $k^{th}$ RE and the $(k+1)^{th}$ RE. In this case, k+2 is assigned to k, and it is determined whether a $(k+2)^{th}$ RE exceeds the boundary of the physical resource block.

Step 705: Determine whether a $(k+2)^{th}$ RE exceeds the boundary of the physical resource block. If the $(k+2)^{th}$ RE exceeds the boundary of the physical resource block, perform step 707; or if the $(k+2)^{th}$ RE does not exceed the boundary of the physical resource block, perform step 708.

Likewise, if the $(k+2)^{th}$ RE exceeds the boundary of physical resource block, it means that the $k^{th}$ RE is a last RE, and there is no RE to be paired with the $k^{th}$RE. Therefore, it is determined that the $k^{th}$ RE is an isolated RE, and the determining ends. Alternatively, if the $(k+1)^{th}$ RE does not exceed the boundary of the physical resource block, the determining continues.

Step 706: k=k+2.

Step 707: Determine that the $k^{th}$ RE is an isolated RE.

Step 708: Determine whether the $(k+2)^{th}$ RE is a reference signal RE. If the $(k+2)^{th}$ RE is a reference signal RE, sequentially perform step 709 and step 710; or if the $(k+2)^{th}$ RE is not a reference signal RE, directly perform step 710.

If the $(k+2)^{th}$ RE is a reference signal RE, the $k^{th}$ RE cannot be paired with an RE that has a distance of fewer than three subcarriers from the $k^{th}$ RE. Therefore, the $k^{th}$ RE is marked as an isolated RE. Alternatively, if the $(k+2)^{th}$ RE is not a reference signal RE, the $k^{th}$ RE can be paired with the $(k+2)^{th}$ RE. Further, after the foregoing steps, k+3 is assigned to k, and it is determined whether a $(k+3)^{th}$ RE exceeds the boundary of the physical resource block.

Step 709: Mark the $k^{th}$ RE as an isolated RE.

Step 710: k=k+3.

Because a process of determining three REs is performed, the determining continues after k jumps for the three REs.

Step 711: Determine whether k exceeds the boundary of the physical resource block in this case. If k exceeds the boundary of the physical resource block, the procedure ends; or if k does not exceed the boundary of the physical resource block, perform step 701 to re-perform the foregoing determining procedure.

Based on the determining procedure shown in FIG. 7A and FIG. 7B, the location of the isolated RE in (a) in FIG. 4 is determined as shown in (a) in FIG. 8. Correspondingly, the location of the isolated RE in (b) in FIG. 4 is determined as shown in (b) in FIG. 8.

For a detailed operation procedure of each step in this embodiment, refer to the description in the foregoing embodiment. Details are not described herein again.

For another example, based on the embodiment shown in FIG. 5, the foregoing step 51 (the first device determines the first resource set and the second resource set in the first transmission subframe) may alternatively be implemented in the following possible manner. Details are shown in FIG. 9.

Figure 9:
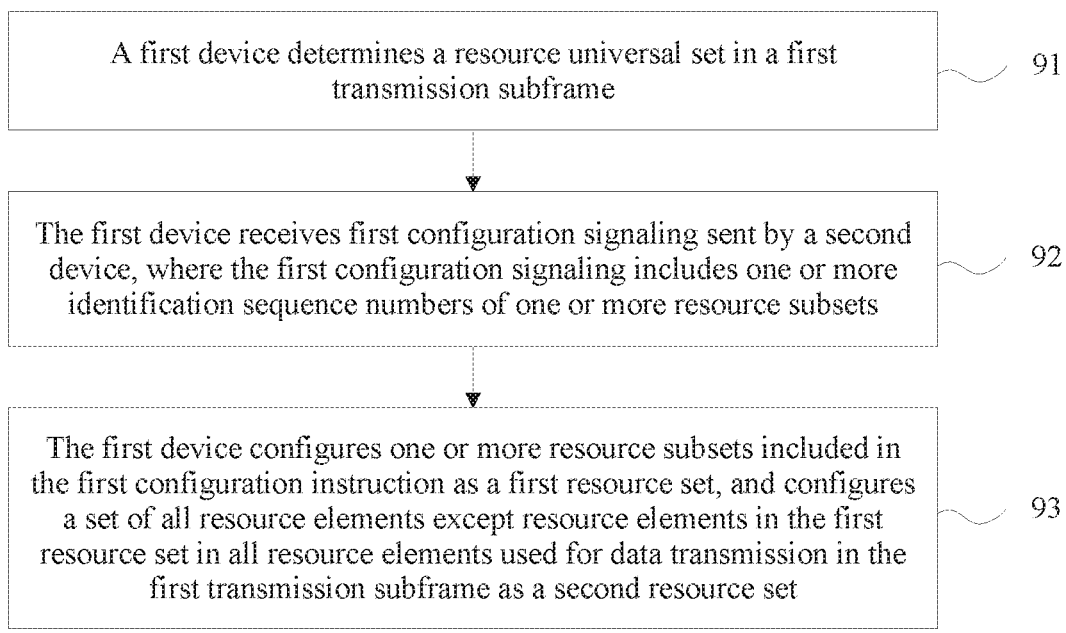
FIG. 9 is a schematic flowchart of Embodiment 3 of a data transmission method according to this application.
Figure 10:
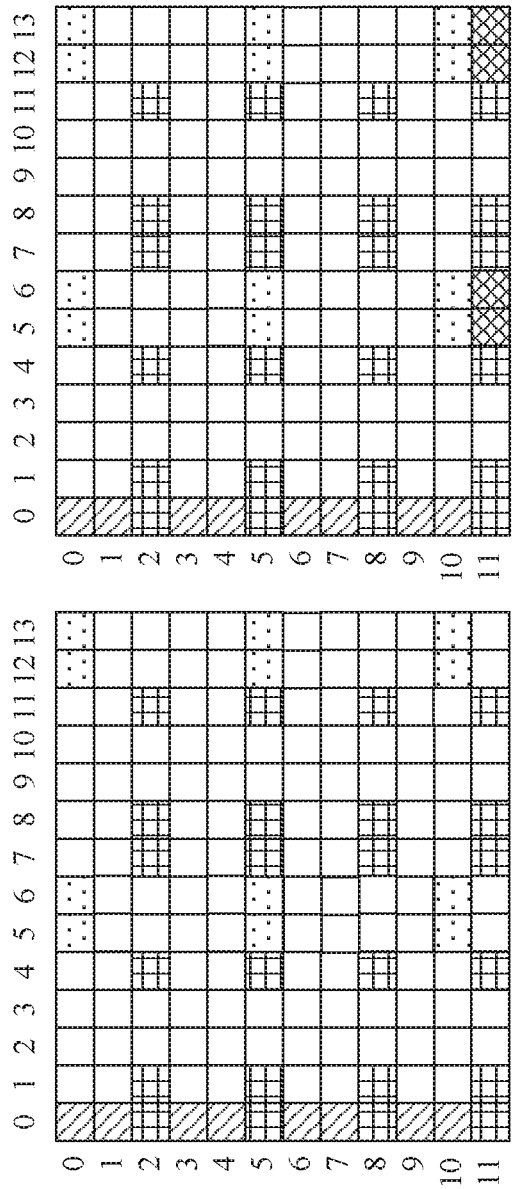
FIG. 10 shows a first resource set and a second resource set determined by using the method according to the embodiment shown in FIG. 9.
Figure 10:
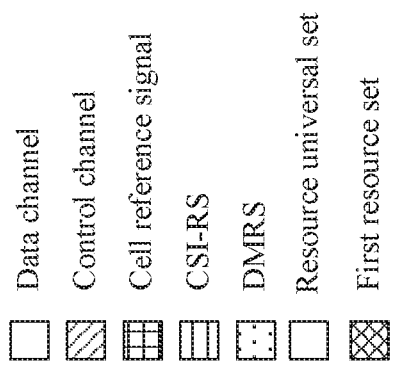
Figure 10:
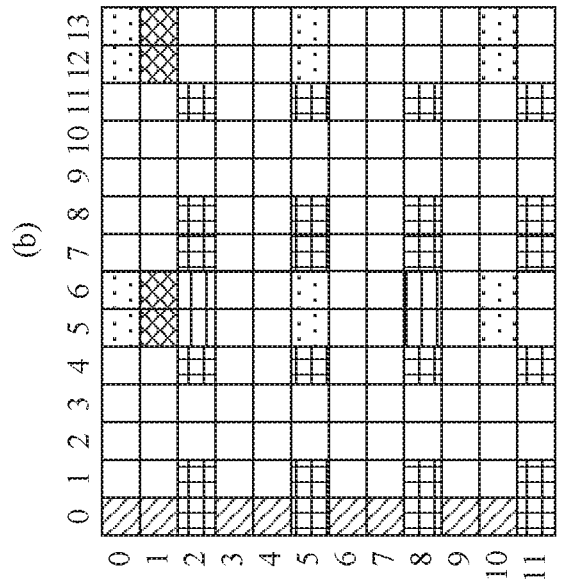
Figure 10:
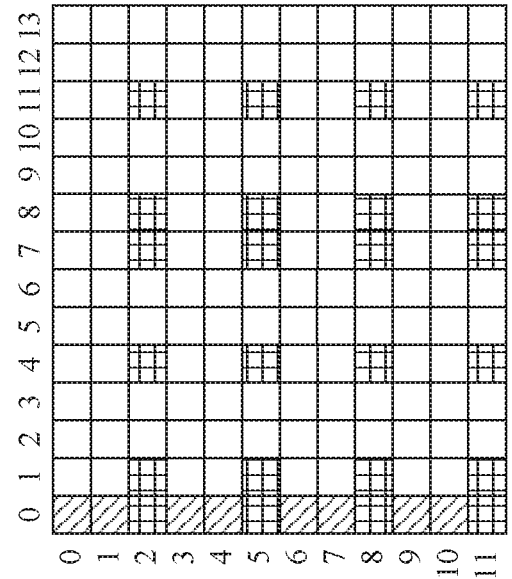

FIG. 9 is a schematic flowchart of Embodiment 3 of a data transmission method according to this application. FIG. 10 shows a first resource set and a second resource set determined by using the method according to the embodiment shown in FIG. 9. With reference to a physical resource block shown in FIG. 10, as shown in FIG. 9, in this embodiment of this application, step 51 may include the following steps:

Step 91: A first device determines a resource universal set in a first transmission subframe.

The resource universal set includes a plurality of resource subsets. Each resource subset includes one or more resource elements, and each resource element has a unique identification sequence number.

In this embodiment, the first device first determines, based on a configuration location of a reference signal, several symbols whose SFBC pairing may be affected by the reference signal. Referring to FIG. 10, the reference signal may affect only four symbols (5, 6, 12, and 13). Then, the first device numbers all subsets in the physical resource block.

Optionally, the first device may number all the subsets in the physical resource block in the following two manners. Manner 1: The first device numbers all physical resource pairs on a data channel based on the symbols that may be affected by the reference signal; and Manner 2: The first device numbers all physical resource pairs based on the symbols that may be affected by the reference signal.

Referring to FIG. 10, in Manner 1, the resource universal set that is in the first transmission subframe and that is determined by the first device includes nine resource subsets. A schematic diagram of the resource universal set is specifically shown in (a) in FIG. 10, and numbers of the nine resource subsets are separately as follow:

{ 1:{(1,5),(1,6),(1,12),(1,13)},
2:{(2,5),(2,6),(2,12)(2,13)},
3:{(3,5),(3,6),(3,12),(3,13)},
4:{(4,5),(4,6),(4,12),(4,13)},
5:{(6,5),(6,6),(6,12),(6,13)},
6:{(7,5),(7,6),(7,12),(7,13)},
7:{(8,5),(8,6),(8,12),(8,13)},
8:{(9,5),(9,6),(9,12),(9,13)},
9:{(11,5),(11,6),(11,12),(11,13)}
}

Referring to FIG. 10, in Manner 2, the resource universal set that is in the first transmission subframe and that is determined by the first device includes 12 resource subsets. A schematic diagram of the resource universal set is specifically shown in (c) in FIG. 10, and numbers of the 12 resource subsets are separately as follows:

{ 1:{(0,5),(0,6),(0,12),(0,13)},
2:{(1,5),(1,6),(1,12),(1,13)},
3:{(2,5),(2,6),(2,12),(2,13)},
4:{(3,5),(3,6),(3,12),(3,13)},
5:{(4,5),(4,6),(4,12),(4,13)},
6:{(5,5),(5,6),(5,12),(5,13)},
7:{(6,5),(6,6),(6,12),(6,13)},
8:{(7,5),(7,6),(7,12),(7,13)},
9:{(8,5),(8,6),(8,12),(8,13)},
10:{(9,5),(9,6),(9,12),(9,13)},
11:{(10,5),(10,6),(10,12),(10,13)},
12:{(11,5),(11,6),(11,12),(11,13)}
}

Step 92: The first device receives first configuration signaling sent by a second device, where the first configuration signaling includes an identification sequence number of one or more resource subsets.

Optionally, after determining the resource universal set, the first device receives the first configuration instruction sent by the second device; and the first device may determine the first resource set and the second resource set based on the identification sequence numbers that are of the one or more resource subsets and that are included in the first configuration signaling.

Optionally, a configuration capability of a base station is higher than that of a terminal. Therefore, in this embodiment, the first device is optionally a terminal, and the second device is optionally a base station.

Optionally, the first configuration signaling may be semi-static configuration signaling. For example, the semi-static configuration signaling may include but is not limited to radio resource management signaling defined in an LTE system.

In an embodiment, when the first configuration signaling is semi-static configuration signaling, the semi-static configuration signaling may further include a period and a subframe offset status of the first resource set.

In another embodiment, when the first configuration signaling is semi-static configuration signaling, the semi-static configuration signaling may further include a period and a subframe offset status of each resource subset in the first resource set.

In still another embodiment, when the first configuration signaling is semi-static configuration signaling, there may be a dynamically configured reference signal in the first resource set configured based on the semi-static configuration signaling. In this case, a resource element that has been configured as a reference signal needs to be excluded from the first resource set.

Optionally, the first configuration signaling may alternatively be dynamic configuration signaling. For example, the dynamic configuration instruction includes but is not limited to an access control layer control element, physical layer downlink control information, and the like that are defined in the LTE system.

Step 93: The first device configures the one or more resource subsets included in the first configuration instruction as a first resource set, and configures a set of all resource elements other than resource elements in the first resource set in all resource elements used for data transmission in the first transmission subframe as a second resource set.

After receiving the first configuration instruction, the first device may activate the one or more resource subsets in the resource universal set based on the one or more resource subsets included in the first configuration instruction, and configure the one or more resource subsets as the first resource set. Correspondingly, the first device configures the set of all the resource elements other than the resource elements in the first resource set in all the resource elements used for data transmission in the first transmission subframe as the second resource set.

Based on the determining method shown in FIG. 9, the resource universal set is numbered in Manner 1. If the first configuration instruction includes an identification sequence number 9 of a resource subset, as shown in (b) in FIG. 10, the first device may activate a resource subset "9:{(11,5), (11,6),(11,12),(11,13)}" in the resource universal set; in other words, the first device configures the resource subset with the identification sequence number 9 as the first resource set. Likewise, the resource universal set is numbered in Manner 2. If the first configuration instruction includes an identification sequence number 1 of a resource subset, as shown in (d) in FIG. 10, the first device may activate a resource subset "1:{(1,5),(1,6),(1,12),(1,13)}" in the resource universal set; in other words, the first device configures the resource subset with the identification sequence number 1 as the first resource set.

In the data transmission method provided in this embodiment, when the first device determines the first resource set and the second resource set in the first transmission subframe, the first device first determines the resource universal set in the first transmission subframe, where the resource universal set includes the plurality of resource subsets, each resource subset includes one or more resource elements, and each resource element has a unique identification sequence number; then the first device receives the first configuration signaling sent by the second device, where the first configuration signaling includes the identification sequence number of the one or more resource subsets; and finally, the first device configures the one or more resource subsets included in the first configuration instruction as the first resource set, and configures the set of all the resource elements other than the resource elements in the first resource set in all the resource elements used for data transmission in the first transmission subframe as the second resource set. In this technical solution, the first device can determine the first resource set and the second resource set in the first transmission subframe. This provides a basis for subsequently determining a data transmission method and implementing accurate data transmission.

For still another example, based on the embodiment shown in FIG. 5, the foregoing step 51 (the first device determines the first resource set and the second resource set in the first transmission subframe) may be further implemented in the following possible manner, as specifically shown in FIG. 11.

Figure 11:
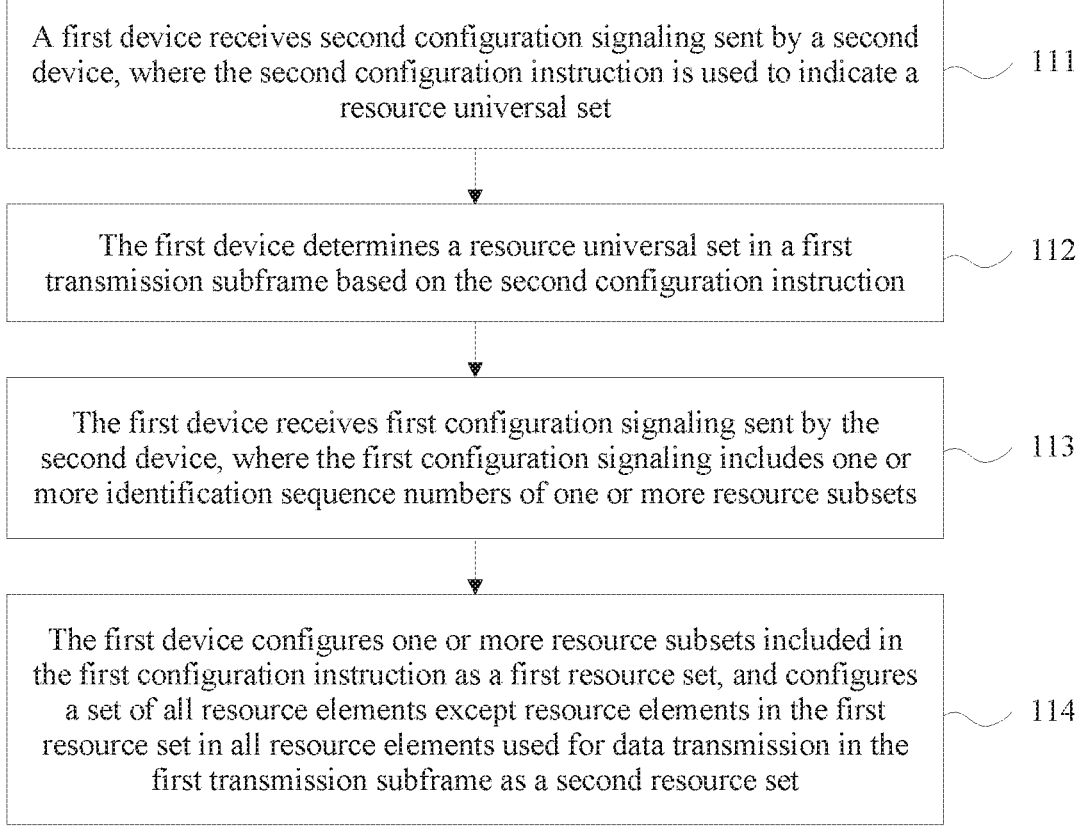
FIG. 11 is a schematic flowchart of Embodiment 4 of a data transmission method according to this application.
Figure 12:
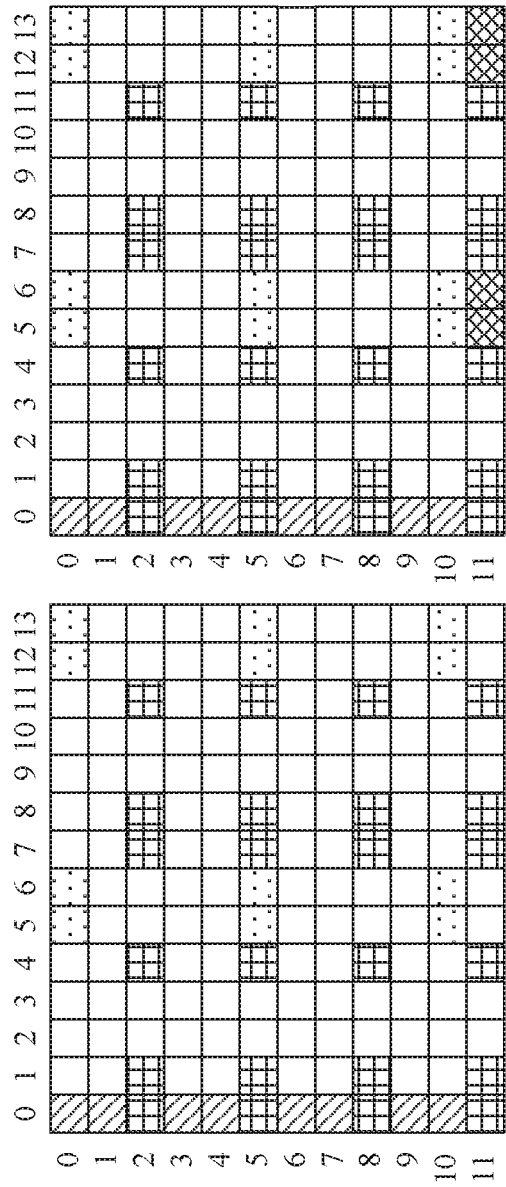
FIG. 12 shows a first resource set and a second resource set determined by using the method according to the embodiment shown in FIG. 11.
Figure 12:
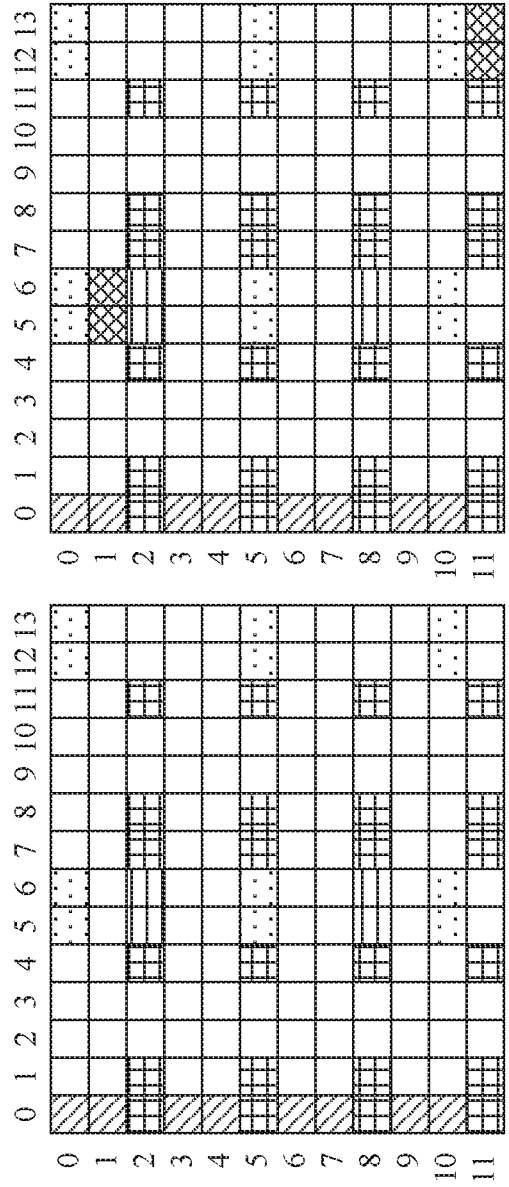

FIG. 11 is a schematic flowchart of Embodiment 4 of a data transmission method according to this application. FIG. 12 shows a first resource set and a second resource set determined by using the method according to the embodiment shown in FIG. 11. With reference to a physical resource block shown in FIG. 12, as shown in FIG. 11, in this embodiment of this application, step 51 may include the following steps:

Step 111: A first device receives second configuration signaling sent by a second device, where the second configuration instruction is used to indicate a resource universal set.

In this embodiment, the first device receives the second configuration signaling from the second device, where the second configuration signaling indicates a resource universal set. Content specifically indicated by the second configuration instruction includes:

(1) The resource universal set includes N resource subsets, where N is a positive integer greater than 1.

(2) Each resource subset is corresponding to a unique identification sequence number.

(3) Each resource subset includes location information of one or more resource elements, for example, a resource element on a $k^{th}$ subcarrier in a first time domain symbol.

Optionally, the second configuration signaling is similar to the first configuration instruction, and the second configuration signaling is semi-static configuration signaling. For example, the semi-static configuration signaling may include but is not limited to radio resource management signaling defined in an LTE system.

In an embodiment, when the second configuration signaling is semi-static configuration signaling, the semi-static configuration signaling may further include a period and a subframe offset status of the resource universal set.

In another embodiment, when the second configuration signaling is semi-static configuration signaling, the semi-static configuration signaling may further include a period and a subframe offset status of each candidate resource subset in the resource universal set.

Optionally, the second configuration signaling may alternatively be dynamic configuration signaling. For example, the dynamic configuration instruction includes but is not limited to an access control layer control element, physical layer downlink control information, and the like that are defined in the LTE system.

Step 112: The first device determines a resource universal set in a first transmission subframe based on the second configuration instruction.

The resource universal set includes a plurality of resource subsets. Each resource subset includes one or more resource elements, and each resource element has a unique identification sequence number.

In this embodiment, the first device first determines, based on the received second configuration instruction, a set of isolated resource elements that possibly occur; in other words, the resource universal set. Optionally, in an embodiment, referring to (a) in FIG. 12, the resource universal set indicated by the second configuration instruction includes four resource subsets, and numbers of the four resource subsets are as follows:

{ 1:{(1,5),(1,6)},
2:{(1,12),(1,13)},
3:{(11,5),(11,6)},
4:{(11,12),(11,13)}
}

Likewise, in another embodiment, referring to (c) in FIG. 12, the resource universal set indicated by the second configuration instruction includes four resource subsets, and numbers of the four resource subsets are as follows:

{ 1:{(1,5),(1,6)},
2:{(9,5),(9,6)},
3:{(11,5),(11,6)},
4:{(11,12),(11,13)}
}

Step 113: The first device receives first configuration signaling sent by the second device, where the first configuration signaling includes an identification sequence number of one or more resource subsets.

Optionally, after determining the resource universal set, the first device receives the first configuration instruction sent by the second device. A specific representation form of the first configuration instruction is consistent with that in the embodiment shown in FIG. 9. For a specific representation form of the first configuration instruction, refer to the description in step 92 in the embodiment shown in FIG. 9. Details are not described herein again.

It should be noted that this embodiment is similar to the embodiment shown in FIG. 9. Generally, a configuration capability of a base station is higher than that of a terminal. Therefore, in this embodiment, the second device that sends the first configuration instruction and the second configuration instruction is optionally a base station; and correspondingly, the first device that receives the first configuration instruction and the second configuration instruction is optionally a terminal.

Step 114: The first device configures the one or more resource subsets included in the first configuration instruction as a first resource set, and configures a set of all resource elements other than resource elements in the first resource set in all resource elements used for data transmission in the first transmission subframe as a second resource set.

A specific implementation of this step is similar to that of step 93. Details are not described herein again.

For the resource universal set shown in (a) in FIG. 12, if the first configuration instruction includes identification sequence numbers 3 and 4 of resource subsets, as shown in (b) in FIG. 12, the first device may activate resource subsets "3: {(11,5),(11,6)}" and "4:{(11,12),(11,13)}" in the resource universal set; in other words, the first device configures the resource subsets with the identification sequence numbers 3 and 4 as the first resource set. For the resource universal set shown in (b) in FIG. 12, if the first configuration instruction includes identification sequence numbers 1 and 4 of resource subsets, as shown in (b) in FIG. 12, the first device may activate resource subsets "1: {(1.5), (1.6)}" and "4:{(11,12),(11,13)}" in the resource universal set; in other words, the first device configures the resource subsets with the identification sequence numbers 1 and 4 as the first resource set.

In the data transmission method provided in this embodiment, when the first device determines the first resource set and the second resource set in the first transmission subframe, the first device receives the second configuration signaling sent by the second device, and determines the resource universal set in the first transmission subframe based on the second configuration instruction, where the resource universal set includes the plurality of resource subsets, each resource subset includes one or more resource elements, and each resource element has a unique identification sequence number; and the first device further receives the first configuration signaling sent by the second device, where the first configuration signaling includes the identification sequence number of the one or more resource subsets. In this way, the first device configures the one or more resource subsets included in the first configuration instruction as the first resource set, and configures the set of all the resource elements other than the resource elements in the first resource set in all the resource elements used for data transmission in the first transmission subframe as the second resource set. In this technical solution, the first device can also accurately determine the first resource set and the second resource set in the first transmission subframe. This provides a basis for subsequently determining a data transmission method and implementing accurate data transmission.

Figure 13:
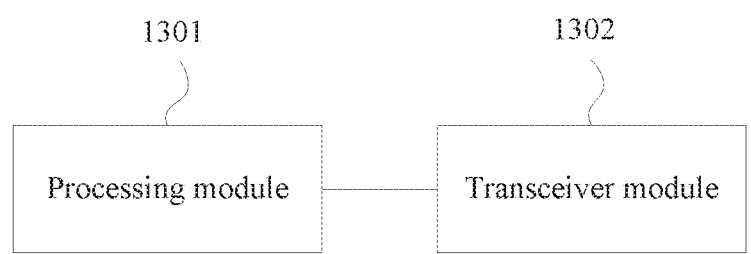
FIG. 13 is a schematic structural diagram of a data transmission apparatus according to an embodiment of this application.

FIG. 13 is a schematic structural diagram of a data transmission apparatus according to an embodiment of this application. The data transmission apparatus is integrated into a first device. As shown in FIG. 13, the data transmission apparatus in this embodiment may include a processing module 1301 and a transceiver module 1302.

The processing module 1301 is configured to determine a first resource set and a second resource set in a first transmission subframe.

The first resource set is a set of remaining resource elements other than resource elements paired based on a first pairing rule in all resource elements used for data transmission in the first transmission subframe, and the second resource set is a set of the resource elements paired based on the first pairing rule in all the resource elements used for data transmission in the first transmission subframe.

The processing module 1301 is further configured to determine a data transmission manner on the first resource set and the second resource set.

The transceiver module 1302 is configured to send data to a second device based on the determined data transmission manner by using the first transmission subframe, or receive data sent by a second device in the first transmission subframe.

Optionally, when determining the data transmission manner on the first resource set and the second resource set, the processing module 1301 is specifically configured to determine that the transmission manner on the second resource set is transmit diversity transmission of space frequency block coding, and determine that the transmission manner on the first resource set is no data transmission or space time block coding transmission.

The first pairing rule includes: Two paired resource elements belong to a same time domain unit and a same frequency domain unit, and cross a maximum of three subcarriers.

The frequency domain unit includes a frequency domain width of one or more physical resource blocks, and the time domain unit includes one or more OFDM symbols.

Optionally, in an embodiment, when determining the first resource set and the second resource set in the first transmission subframe, the processing module 1301 is specifically configured to: successively determine, in a preset sequence, whether all the resource elements used for data transmission in the first transmission subframe meet the first pairing rule; when a resource element used for data channel mapping on a $k^{th}$ subcarrier and a resource element used for data channel mapping on a $(k+n)^{th}$ subcarrier meet the first pairing rule, determine that the resource elements used for data channel mapping on the $k^{th}$ subcarrier and the $(k+n)^{th}$ subcarrier belong to the second resource set; and determine a set of all resource elements other than resource elements in the second resource set in all the resource elements used for data transmission in the first transmission subframe as the first resource set.

n is a positive integer less than 3, k is a sequence number of a subcarrier corresponding to a resource element used for data channel mapping, and k is a positive integer greater than or equal to 1.

Further, when determining the first resource set and the second resource set in the first transmission subframe, the processing module 1301 is further specifically configured to: after determining on all resource elements in all time domain units in a preset frequency domain unit in the first transmission subframe is completed, copy a determining result of each resource element in the preset frequency domain unit to another frequency domain unit in the first transmission subframe.

It should be noted that the frequency domain unit in the first transmission subframe meets the following two conditions: In all frequency domain units, configurations of demodulation reference signals are consistent, configurations of channel state information-reference signals are consistent, and the demodulation reference signals have a same precoding matrix.

Optionally, in another embodiment, when determining the first resource set and the second resource set in the first transmission subframe, the processing module 1301 is specifically configured to: determine a resource universal set in the first transmission subframe, where the resource universal set includes a plurality of resource subsets, each resource subset includes one or more resource elements, and each resource element has a unique identification sequence number; receive first configuration signaling sent by the second device, where the first configuration signaling includes an identification sequence number of one or more resource subsets; and configure the one or more resource subsets included in the first configuration instruction as the first resource set, and configure a set of all resource elements other than resource elements in the first resource set in all the resource elements used for data transmission in the first transmission subframe as the second resource set.

Optionally, in still another embodiment, when determining the first resource set and the second resource set in the first transmission subframe, the processing module 1301 is specifically configured to: receive second configuration signaling sent by the second device, where the second configuration instruction is used to indicate a resource universal set; determine a resource universal set in the first transmission subframe based on the second configuration instruction, where the resource universal set includes a plurality of resource subsets, each resource subset includes one or more resource elements, and each resource element has a unique identification sequence number; receive first configuration signaling sent by the second device, where the first configuration signaling includes an identification sequence number of one or more resource subsets; and configure the one or more resource subsets included in the first configuration instruction as the first resource set, and configure a set of all resource elements other than resource elements in the first resource set in all the resource elements used for data transmission in the first transmission subframe as the second resource set.

Optionally, for example, when determining that the transmission manner on the second resource set is the transmit diversity transmission of space frequency block coding, the processing module 1301 is specifically configured to successively map a transmission symbol encoded through space frequency block coding on each of a plurality of antenna ports to physical resources, to be specific, to all the resource elements in the second resource set.

Optionally, for another example, when determining that the transmission manner on the first resource set is no data transmission or the space time block coding transmission, the processing module 1301 is specifically configured to determine that no resource element in the first resource set is mapped to any transmission symbol; or the first device successively maps a transmission symbol encoded through space time block coding on each of a plurality of antenna ports to all the resource elements in the first resource set.

An implementation principle and a technical effect of the data transmission apparatus are similar to those in the method embodiment shown in FIG. 1 to FIG. 12. Details are not described herein again.

It should be noted that division of the modules in the foregoing apparatus is merely logical function division. In actual implementation, all or some of the modules may be integrated into one physical entity, or the modules may be physically separated. In addition, these modules may all be implemented in a form of software invoked by using a processing element, may all be implemented in a form of hardware, or some modules may be implemented in a form of software invoked by using a processing element and some modules may be implemented in a form of hardware. For example, a determining module may be a separately disposed processing element, or may be integrated into a chip of the foregoing apparatus for implementation. In addition, the determining module may be stored in a memory of the apparatus in a form of program code and invoked by a processing element of the apparatus to execute a function of the determining module. Implementation of other modules is similar to this. In addition, all or some of these modules may be integrated together or these modules may be implemented separately. The processing element herein may be an integrated circuit and have a signal processing capability. In an implementation process, the steps of the foregoing methods or the foregoing modules may be performed by using an integrated logical circuit in hardware in a processing element or an instruction in a form of software in the processing unit.

For example, the foregoing modules may be configured as one or more integrated circuits that implement the foregoing methods, for example, one or more application-specific integrated circuits (application-specific integrated circuit, ASIC), one or more digital signal processors (digital signal processor, DSP), or one or more field programmable gate arrays (field programmable gate array, FPGA). For another example, when one of the foregoing modules is implemented by using the processing element to schedule the program code, the processing element may be a general purpose processor, for example, a central processing unit (central processing unit, CPU), or another processor that can invoke the program code. For another example, these modules may be integrated together and implemented in a form of a System-On-a-Chip (system-on-a-chip, SOC).

All or some of the foregoing embodiments may be implemented by using software, hardware, firmware, or any combination thereof. When the embodiments are implemented by using software, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or may be a data storage device such as a server or a data center integrated by one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Figure 14:
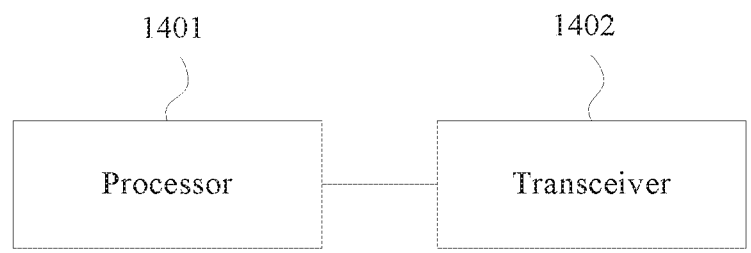
FIG. 14 is a schematic structural diagram of another data transmission apparatus according to an embodiment of this application.

FIG. 14 is a schematic structural diagram of another data transmission apparatus according to an embodiment of this application. The data transmission apparatus is integrated into a first device. As shown in FIG. 14, the data transmission apparatus in this embodiment may include a processor 1401 and a transceiver 1402. Optionally, the data transmission apparatus may further include a memory. The memory is configured to store code executed by the processor 1401. Optionally, the transceiver 1402 may be implemented by a transmitter and a receiver with independent functions. Both the transmitter and the receiver may be implemented in a form of an antenna. This is not limited in this embodiment of this application. The processor 1401 and the transceiver 1402 are configured to run a computer execution instruction, so that the data transmission apparatus performs the steps of the foregoing data transmission method.

Specifically, in FIG. 13, the processing module 1301 is corresponding to the processor 1401, and the transceiver module 1302 is corresponding to the transceiver 1402, and the like.

The data transmission method and apparatus provided in this embodiment of this application are applicable to a base station and a terminal that are based on the LTE standard in the communications system. When SFBC transmission is performed on an RE on a PDSCH, if a DMRS and/or a CSI-RS exist/exists in a PRB in scheduled bandwidth, all the resource elements used for data transmission in the first transmission subframe are grouped into a first resource set and a second resource set, so that both the base station and the terminal learn a location of an isolated resource element in the PRB. The data transmission manners on the first resource set and the second resource set in the first transmission subframe are separately determined, so that the base station and the terminal can implement rate matching when performing resource mapping. In this way, physical layer resources can be utilized to a maximum extent, thereby avoiding resource waste.

What is claimed is:

1. A data transmission method performed by a first device, comprising:
   determining a first resource set and a second resource set in a first transmission subframe comprising a plurality of resource elements, wherein the first resource set comprises first resource elements in the first transmission subframe excluding second resource elements in the first transmission subframe that are paired based on a first pairing rule, wherein the second resource set comprises the second resource elements in the first transmission subframe that are paired based on the first pairing rule;
   determining a data transmission manner for the first resource set and the second resource set; and
   communicating data with a second device based on the data transmission manner using the first transmission subframe,
   wherein determining the first resource set and the second resource set in the first transmission subframe comprises:
   successively determining in a preset sequence, whether all the resource elements used for data transmission in the first transmission subframe meet the first pairing rule;
   when a resource element used for data channel mapping on a $k^{th}$ subcarrier and a resource element used for data channel mapping on a $(k+n)^{th}$ subcarrier meet the first pairing rule, determining, by the first device, that the resource elements used for data channel mapping on the $k^{th}$ subcarrier and the $(k+n)^{th}$ subcarrier belong to the second resource set, wherein n is a positive integer less than 3, k is a sequence number of a subcarrier corresponding to a resource element used for data channel mapping, and k is a positive integer greater than or equal to 1; and
   determining a set of all resource elements other than resource elements in the second resource set in all the resource elements used for data transmission in the first transmission subframe as the first resource set.

2. The method of claim 1, wherein determining the data transmission manner for the first resource set and the second resource set comprises:
   determining that a transmission manner for the second resource set is transmit diversity transmission of space frequency block coding; and
   determining that a transmission manner for the first resource set includes using space time block coding transmission or keeping the first resource elements of the first resource set empty.

3. The method of claim 2, wherein determining that the transmission manner for the second resource set is transmit diversity transmission of space frequency block coding comprises successively mapping a transmission symbol encoded through space frequency block coding on each of a plurality of antenna ports to the second resource elements of the second resource set.

4. The method of claim 2, wherein determining that the transmission manner for the first resource set includes using space time block coding transmission or keeping the first resource elements of the first resource set empty comprises determining that a first resource element in the first resource set is not mapped to any transmission symbol, or successively mapping a transmission symbol encoded through space time block coding on each of a plurality of antenna ports to the first resource elements of the first resource set.

5. The method of claim 1, wherein the first pairing rule comprises the following conditions:
   two paired resource elements belong to a same time domain unit and a same frequency domain unit, and cross a maximum of three subcarriers,
   the same frequency domain unit comprises a frequency domain width of one or more physical resource blocks, and
   the same time domain unit comprises one or more orthogonal frequency division multiplexing (OFDM) symbols.

6. The method of claim 1, further comprising after determining all resource elements in all time domain units in a preset frequency domain unit in the first transmission subframe, copying a determining result of each resource element in the preset frequency domain unit to another frequency domain unit in the first transmission subframe, wherein the same frequency domain unit in the first transmission subframe meets the following two conditions:
   configurations of demodulation reference signals in all frequency domain units are consistent and configurations of channel state information-reference signals are consistent in all frequency domain units, and
   the demodulation reference signals have a same precoding matrix.

7. The method of claim 1,
   wherein each resource element in the plurality of resource elements of the first transmission subframe has a unique identification sequence number.

8. The method of claim 1, wherein the first resource elements in the first resource set are isolated resource elements that are not paired according to the first pairing rule.

9. The method of claim 1, wherein the data transmission manner for the first resource set comprises leaving the first resource elements empty.

10. A first device, comprising:
    a memory comprising instructions; and
    a processor configured to execute the instructions, which cause the processor to be configured to:

determine a first resource set and a second resource set in a first transmission subframe comprising a plurality of resource elements, wherein the first resource comprises first resource elements in the first transmission subframe excluding second resource elements in the first transmission subframe paired based on a first pairing rule, wherein the second resource set comprises the second resource elements in the first transmission subframe that paired based on the first pairing rule;

determine a data transmission manner for the first resource set and the second resource set; and communicate data with a second device based on the data transmission manner using the first transmission subframe, wherein, to determine the first resource set and the second resource set in the first transmission subframe, the instructions further cause the processor to be configured to:

successively determine in a preset sequence, whether all the resource elements used for data transmission in the first transmission subframe meet the first pairing rule, wherein a resource element used for data channel mapping on a $k^{th}$ subcarrier and a resource element used for data channel mapping on a $(k+n)^{th}$ subcarrier meet the first pairing rule;

determine that the resource elements used for data channel mapping on the $k^{th}$ subcarrier and the $(k+n)^{th}$ subcarrier belong to the second resource set, wherein n is a positive integer less than 3, k is a sequence number of a subcarrier corresponding to a resource element used for data channel mapping, and k is a positive integer greater than or equal to 1; and determine, as the first resource set, a set of the first resource elements in the first transmission subframe excluding the second resource elements in the second resource set.

11. The first device of claim 10, wherein the instructions further cause the processor to be configured to:

determine that a transmission manner for the second resource set is transmit diversity transmission of space frequency block coding; and determine that a transmission manner for the first resource set including using space time block coding transmission or keeping the first resource elements of the first resource set empty.

12. The first device of claim 11, wherein the instructions further cause the processor to be configured to successively map a transmission symbol encoded through space frequency block coding on each of a plurality of antenna ports to the second resource elements of the second resource set.

13. The first device of claim 11, wherein the instructions further cause the processor to be configured to determine that a first resource element in the first resource set is not mapped to any transmission symbol, or successively map a transmission symbol encoded through space time block coding on each of a plurality of antenna ports to the first resource elements of the first resource set.

14. The first device of claim 10, wherein the first pairing rule comprises the following conditions:

two paired resource elements belong to a same time domain unit and a same frequency domain unit, and cross a maximum of three subcarriers, the same frequency domain unit comprises a frequency domain width of one or more physical resource blocks, and the same time domain unit comprises one or more orthogonal frequency division multiplexing (OFDM) symbols.

15. The first device of claim 10, wherein the instructions further cause the processor to be configured to after determining all resource elements in all time domain units in a preset frequency domain unit in the first transmission subframe, copy a determining result of each resource element in the preset frequency domain unit to another frequency domain unit in the first transmission subframe, and wherein the same frequency domain unit in the first transmission subframe meets the following two conditions:

configurations of demodulation reference signals are consistent in all frequency domain units and configurations of channel state information-reference signals are consistent in all frequency domain units, and the demodulation reference signals have a same precoding matrix.

16. The first device of claim 10, wherein each resource element in the plurality of resource elements of the first transmission subframe has a unique identification sequence number.

17. The first device of claim 10, wherein the first resource elements in the first resource set are isolated resource elements that are not paired according to the first pairing rule.

18. The first device of claim 10, wherein the data transmission manner for the first resource set comprises leaving the first resource elements empty.

19. A computer program product comprising computer-executable instructions stored on a non-transitory computer readable medium that, when executed by a processor, cause a communication apparatus to:

determine a first resource set and a second resource set in a first transmission subframe comprising a plurality of resource elements, wherein the first resource comprises first resource elements in the first transmission subframe excluding second resource elements in the first transmission subframe paired based on a first pairing rule, wherein the second resource set comprises the second resource elements in the first transmission subframe that paired based on the first pairing rule;

determine a data transmission manner for the first resource set and the second resource set; and communicate data with a second device based on the data transmission manner using the first transmission subframe; and wherein, to determine the first resource set and the second resource set in the first transmission subframe, the instructions further cause the communication apparatus to:

successively determine in a preset sequence, whether all the resource elements used for data transmission in the first transmission subframe meet the first pairing rule, wherein a resource element used for data channel mapping on a $k^{th}$ subcarrier and a resource element used for data channel mapping on a $(k+n)^{th}$ subcarrier meet the first pairing rule;

determine that the resource elements used for data channel mapping on the $k^{th}$ subcarrier and the $(k+n)^{th}$ subcarrier belong to the second resource set, wherein n is a positive integer less than 3, k is a sequence number of a subcarrier corresponding to a resource element used for data channel mapping, and k is a positive integer greater than or equal to 1; and determine, as the first resource set, a set of the first resource elements in the first transmission subframe excluding the second resource elements in the second resource set.

20. The computer program product of claim 19, wherein the program code further causes the processor to be configured to:
determine that a transmission manner for the second resource set is transmit diversity transmission of space frequency block coding; and
determine that a transmission manner for the first resource set including using space time block coding transmission or keeping the first resource elements of the first resource set empty.

* * * * *